United States Patent
Sato

(10) Patent No.: US 8,924,430 B2
(45) Date of Patent: Dec. 30, 2014

(54) IMAGE PROCESSING APPARATUS, IMAGE PROCESSING SYSTEM, AND METHOD OF PROCESSING IMAGE

(75) Inventor: Masato Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 798 days.

(21) Appl. No.: 12/320,033

(22) Filed: Jan. 15, 2009

(65) Prior Publication Data

US 2009/0216785 A1 Aug. 27, 2009

(30) Foreign Application Priority Data

Feb. 27, 2008 (JP) ................. 2008-045682

(51) Int. Cl.
*G06F 17/30* (2006.01)

(52) U.S. Cl.
USPC .......................... 707/803; 707/805

(58) Field of Classification Search
CPC ... H04L 63/08; H04L 63/0823; H04L 9/3268; H04L 9/3263; H04N 2201/0094
USPC .................. 707/687, 915, 803, 805
See application file for complete search history.

(56) References Cited

U.S. PATENT DOCUMENTS

| | | | |
|---|---|---|---|
| 6,233,577 B1 | 5/2001 | Ramasubramani et al. | |
| 6,516,316 B1 | 2/2003 | Ramasubramani et al. | |
| 2002/0026427 A1* | 2/2002 | Kon et al. | 705/67 |
| 2004/0030684 A1* | 2/2004 | Nakata et al. | 707/3 |
| 2005/0021969 A1* | 1/2005 | Williams et al. | 713/176 |
| 2005/0204164 A1* | 9/2005 | Kakii | 713/201 |
| 2006/0092455 A1* | 5/2006 | Maeda et al. | 358/1.15 |
| 2007/0150727 A1* | 6/2007 | Miyazawa | 713/158 |
| 2008/0082677 A1* | 4/2008 | Miyazawa et al. | 709/229 |
| 2009/0125429 A1* | 5/2009 | Takayama | 705/35 |

FOREIGN PATENT DOCUMENTS

JP 11-317735 11/1999

* cited by examiner

*Primary Examiner* — Vincent F Boccio
(74) *Attorney, Agent, or Firm* — Kubotera & Associates, LLC

(57) ABSTRACT

An image processing apparatus having a processing function of an image includes a communication unit for communicating image data using certificate data; a certificate data storage unit for storing the certificate data; a corresponding status output unit for outputting a correlation between the certificate data and the processing function; and an updating unit for updating the correlation between the certificate data and the processing function.

9 Claims, 28 Drawing Sheets

| Version | 3 | 91 |
|---|---|---|
| Serial Number | 0a:10:66:d3:46:21:4f:6b:a9:c0 | 92 |
| Signature algorism | md5WithRSAEncryption | 93 |
| Issuer | CA | 94 |
| Valid period | Jun 29 00:00:00 2005 – Aug 28 23:59:59 2005 | 95 |
| Subject | USER | 96 |
| Public key algorism | rsaEncryption | 97 |
| Public key | RSA Public Key: (1024 bit) ...... | 98 |

IMAGE PROCESSING APPARATUS, IMAGE PROCESSING SYSTEM, AND METHOD OF PROCESSING IMAGE

BACKGROUND OF THE INVENTION AND RELATED ART STATEMENT

The present invention relates to an image processing apparatus, an image processing system, and a method of processing an image.

In a conventional network system, a client device such as an image processing apparatus having functions of a printer, a facsimile, and a multi-function product, and a server device such as a computer and a server are connected to a network such as an LAN (Local Area Network). In the conventional network system, when communication in which the client device is authenticated or encrypted communication is conducted, a certificate may be necessary per client device.

In order to administer a plurality of certificates with a proxy server, there has been a method, in which a specific user account is correlated to a certificate to be used, so that the certificate is added to the user account in user account database. In the method, the user account corresponds to a client device. When communication is conducted, the client device uses the certificate assigned thereto for mutual authentication with a communication destination or encryption of communication contents (refer to Patent Reference).
Patent Reference: Japanese Patent Publication No. 11-317735

In the conventional network system described above, the certificate is issued per client device, so that the client device can utilize a processing function. However, the certificate does not indicate the processing function. Accordingly, it is difficult to identify a type of the processing function from certificate information using the certificate. As a result, when various processing functions are adopted using certificates, it is difficult to identify which certificate is used for which processing function.

In view of the problems described above, an object of the present invention is to provide an image processing apparatus capable of solving the problems of the conventional image processing apparatus.

In the present invention, the image processing apparatus is provided with a corresponding status output unit for outputting a correlation between certificate data and a processing function. Accordingly, it is possible to easily identify the correlation between the certificate data and the processing function, and to confirm whether the certificate data can be used to which of processing function. Further, it is possible to identify certificate data stored but not used.

Further objects and advantages of the invention will be apparent from the following description of the invention.

SUMMARY OF THE INVENTION

In order to attain the objects described above, according to the present invention, an image processing apparatus having a processing function of an image includes a communication unit for communicating image data using certificate data; a certificate data storage unit for storing the certificate data; a corresponding status output unit for outputting a correlation between the certificate data and the processing function; and an updating unit for updating the correlation between the certificate data and the processing function.

In the present invention, the image processing apparatus is provided with the corresponding status output unit for outputting the correlation between the certificate data and the processing function. Accordingly, it is possible to easily identify the correlation between the certificate data and the processing function, and to confirm whether the certificate data can be used to which of processing function. Further, it is possible to identify certificate data stored but not used.

BRIEF DESCRIPTION OF THE DRAWINGS

FIG. 30 is a schematic view showing an example of the certificate according to the first embodiment of the present invention;

DETAILED DESCRIPTION OF THE PREFERRED EMBODIMENTS

Hereunder, embodiments of the present invention will be explained with reference to the accompanying drawings.

First Embodiment

Figure 1:
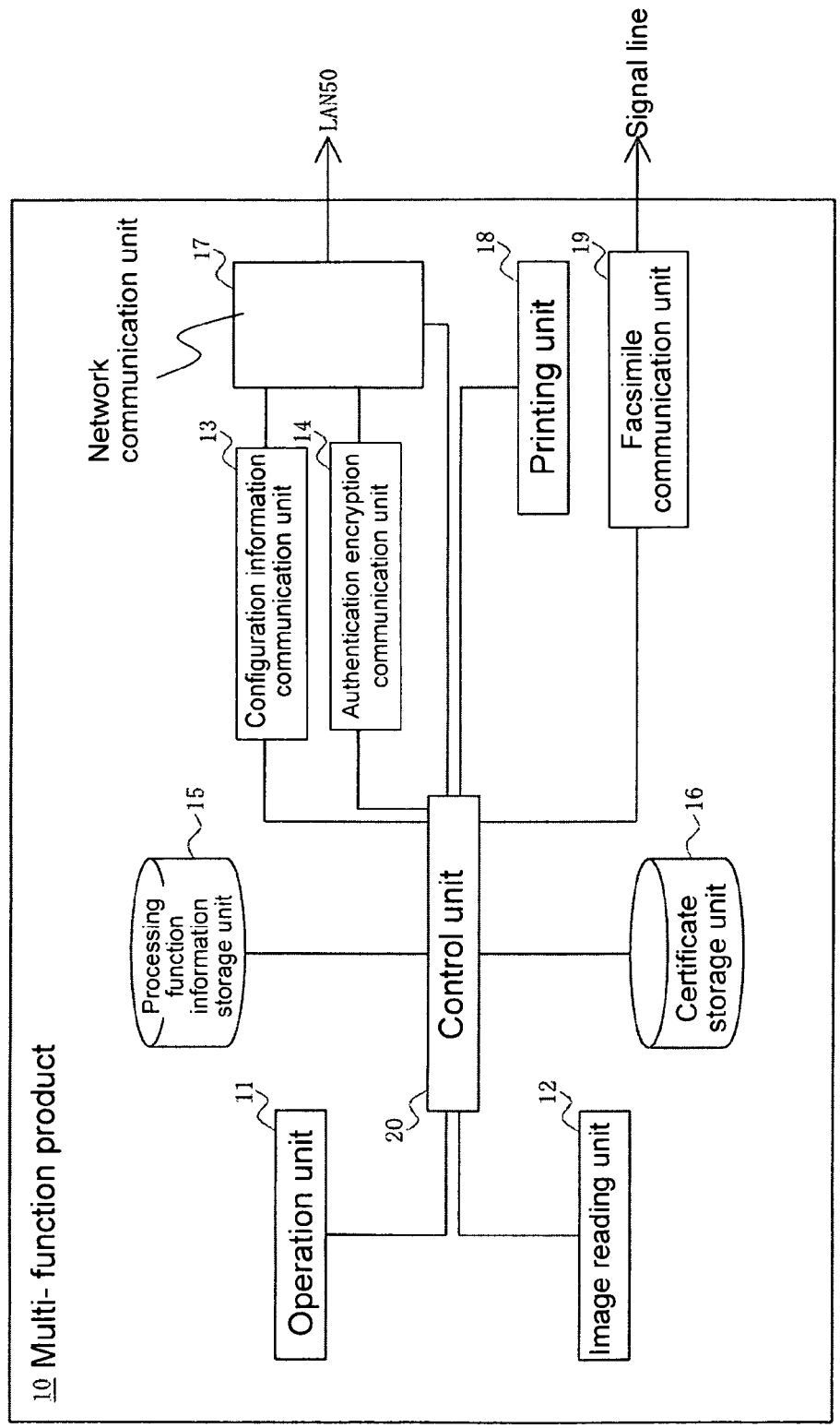
FIG. 1 is a block diagram showing a configuration of a multi-function product according to a first embodiment of the present invention.
Figure 2:
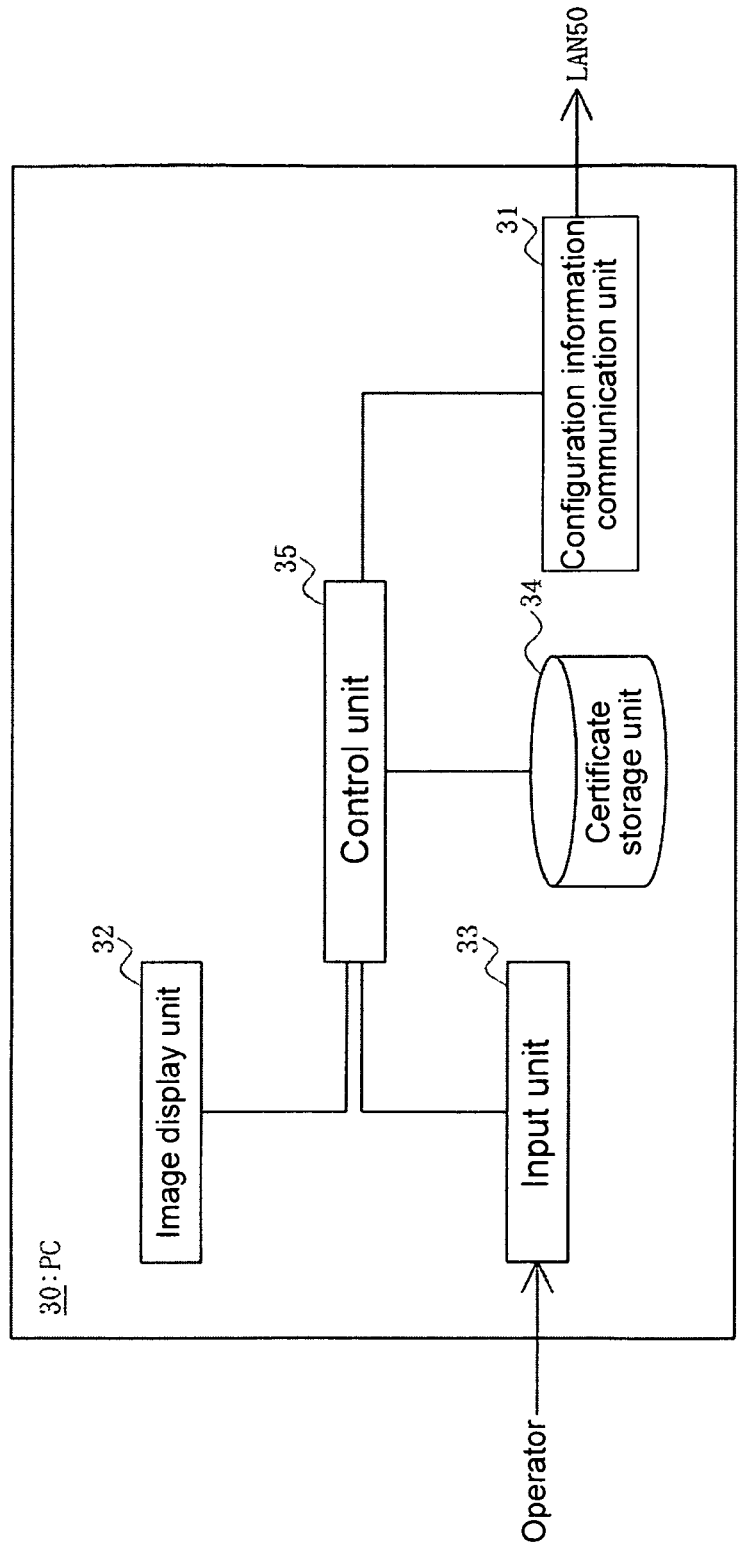
FIG. 2 is a block diagram showing a configuration of a personal computer (PC) according to the first embodiment of the present invention.
Figure 3:
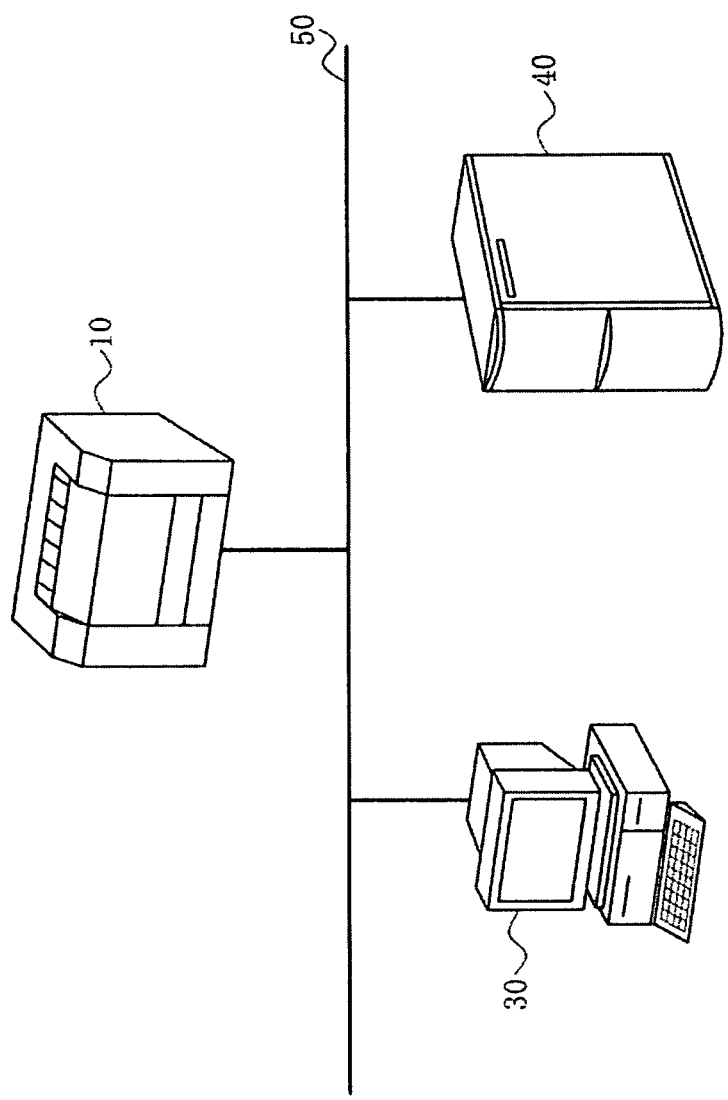
FIG. 3 is a schematic view showing an image processing system according to the first embodiment of the present invention.

A first embodiment of the present invention will be explained. FIG. 1 is a block diagram showing a configuration of a multi-function product 10 according to the first embodiment of the present invention. FIG. 2 is a block diagram showing a configuration of a personal computer (PC) 30 according to the first embodiment of the present invention. FIG. 3 is a schematic view showing an image processing system according to the first embodiment of the present invention.

In the embodiment, the multi-function product 10 is an image processing apparatus having functions of a scanner, a printer, a facsimile, and a copier. As shown in FIG. 3, the multi-function product 10 is connected to the PC 30 as an information processing device or a setting terminal and a mail server 40 as a destination of a processed image applied with encryption communication through an LAN 50 as a communication network for communication. Note that the multi-function product 10, the PC 30, and the mail server 40 are adopted to be capable of communication with TCP/IP (Transmission Control Protocol/Internet Protocol).

In the embodiment, the PC 30 includes a processing unit such as a CPU and an MPU; a storage unit such as a magnetic disk and a semiconductor memory; a display unit such as a CRT and a liquid crystal display; an input device such as a keyboard; a communication interface; and the likes. An operator uses the multi-function product 10 and the PC 30. The mail server 40 includes a processing unit such as a CPU and an MPU; a storage unit such as a magnetic disk and a semiconductor memory; a communication interface; and the likes. The LAN 50 includes a wired or wireless communication network, and may be formed of a plurality of communication networks.

As shown in FIG. 1, the multi-function product 10 includes an operation unit 11; an image reading unit 12; a configuration information communication unit 13; an authentication encryption communication unit 14; a processing function information storage unit 15; a certificate storage unit 16; a network communication unit 17; a printing unit 18; a facsimile communication unit 19; and a control unit 20.

As shown in FIG. 2, the PC 30 includes a setting information communication unit 31; an image display unit 32; an input unit 33; a certificate storage unit 34; and a control unit 35.

The configurations of the multi-function product 10 and the PC 30 will be explained in more detail next.

Figure 4:
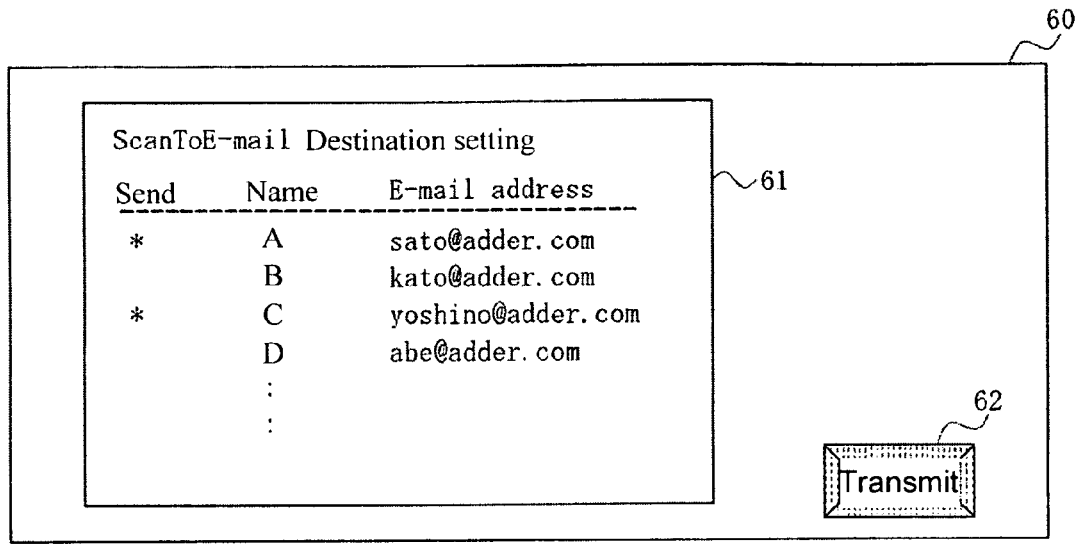
FIG. 4 is a schematic view showing an operation panel of the multi-function product according to the first embodiment of the present invention.
Figure 5:
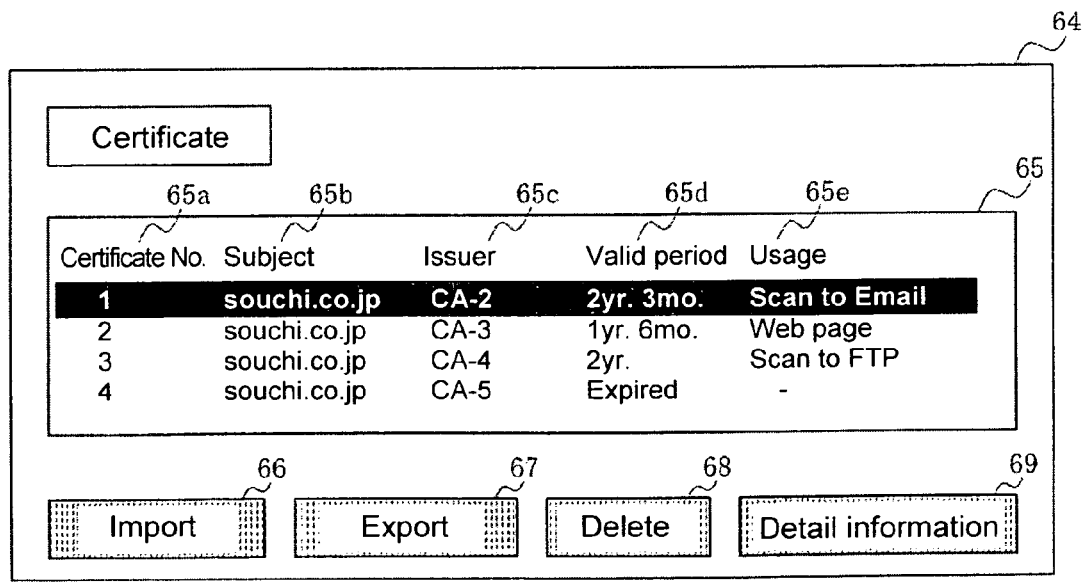
FIG. 5 is a schematic view showing an example of a certificate setting page according to the first embodiment of the present invention.
Figure 6:
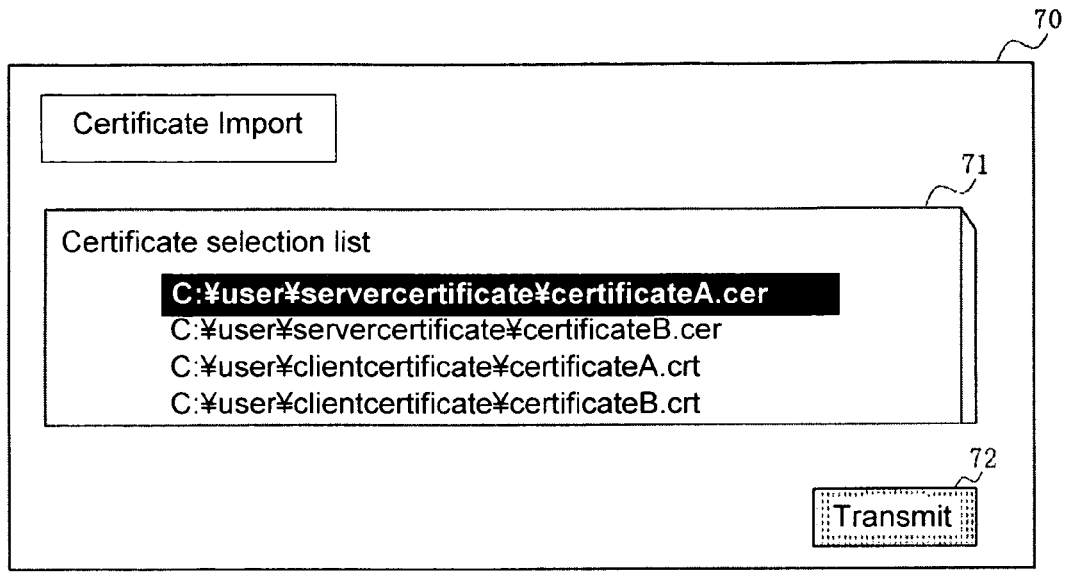
FIG. 6 is a schematic view showing an example of a certificate import page according to the first embodiment of the present invention.
Figure 7:
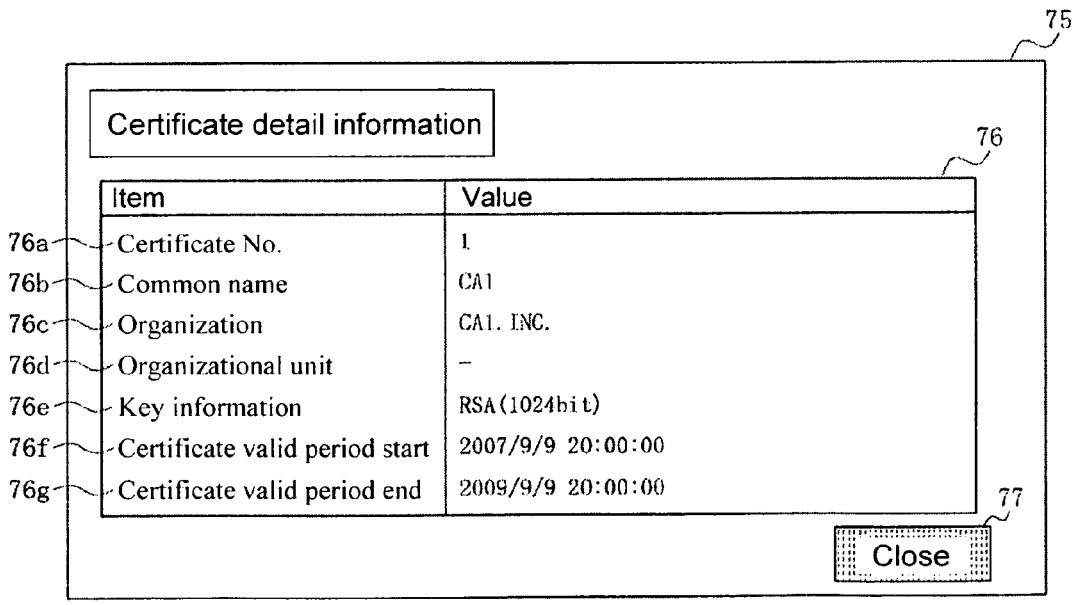
FIG. 7 is a schematic view showing an example of a certificate detail information page according to the first embodiment of the present invention.
Figure 8:
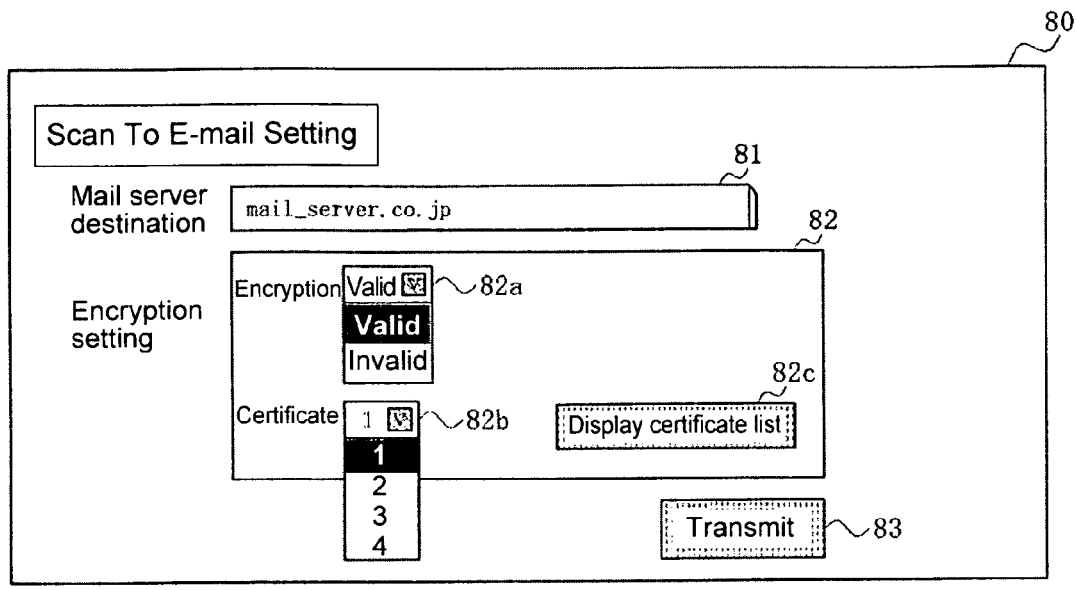
FIG. 8 is a schematic view showing an example of a processing function setting page according to the first embodiment of the present invention.
Figure 9:
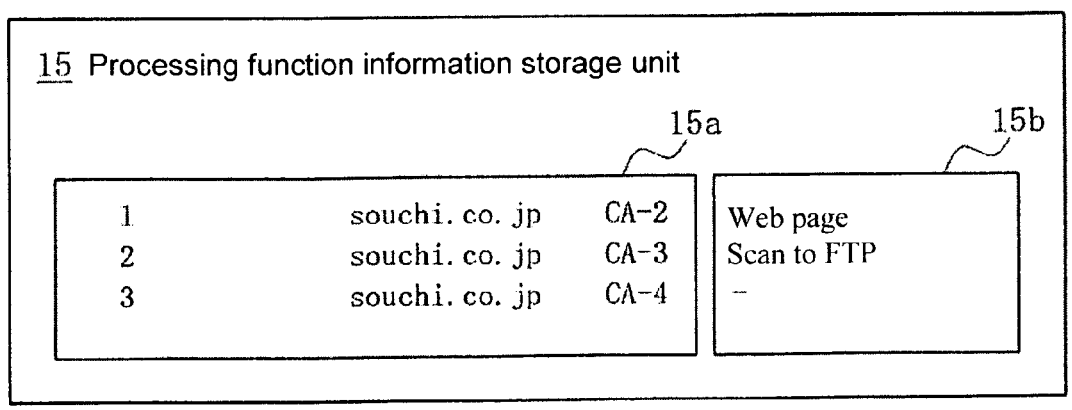
FIG. 9 is a schematic view showing a processing function information storage unit according to the first embodiment of the present invention.

FIG. 4 is a schematic view showing an operation panel 60 of the multi-function product 10 according to the first embodiment of the present invention. FIG. 5 is a schematic view showing an example of a certificate setting page 64 according to the first embodiment of the present invention. FIG. 6 is a schematic view showing an example of a certificate import page 70 according to the first embodiment of the present invention. FIG. 7 is a schematic view showing an example of a certificate detail information page 75 according to the first embodiment of the present invention. FIG. 8 is a schematic view showing an example of a processing function setting page 80 according to the first embodiment of the present invention. FIG. 9 is a schematic view showing the processing function information storage unit 15 according to the first embodiment of the present invention.

As shown in FIG. 4, the operation unit 11 of the multi-function product 10 includes the operation panel 60 as a display unit. The operation panel 60 is a touch panel having a display function and an input function. More specifically, the operation panel 60 includes a display device such as an LCD (Liquid Crystal Display) panel and an LED (Liquid Emitting Diode) panel, and an input device such as a touch sensor. Further, the operation panel 60 includes a destination setting section 61 for setting a destination of an image set in the image reading unit 12, a transmission button 62 for transmitting the image, and the likes. The operator operates the operation panel 60 to set image transmission and transmission direction.

In the embodiment, the image reading unit 12 functions as a scanner for obtaining an image, so that the image reading unit 12 reads an image printed on a sheet set in the multi-function product 10. The configuration information communication unit 13 receives and sends setting information through the LAN 50. For example, when the configuration information communication unit 13 receives a web page request for setting from the PC 30 connected to the LAN 50, the configuration information communication unit 13 sends a web page thus requested. When the operator updates a setting on the web page, the configuration information communication unit 13 receives the change.

As shown in FIG. 5, the certificate setting page 64 is displayed on the image display unit 32 of the PC 30. The certificate setting page 64 includes a certificate list 65, an import request button 66, an export request button 67, a delete request button 68, and a detail information display request button 69.

In the embodiment, the certificate list 65 displays a list of certificates stored in the certificate storage unit 16 of the multi-function product 10. The list includes, for example, a certificate number 65a for indicating a number of a certificate; a subject 65b indicating a subject of a certificate; an issuer 65c indicating an issuer of a certificate; a valid period 65d indicating a time from when a certificate is issued to a current time; and a usage 65e indicating a certificate is used for which processing function of the multi-function product 10. A DN (Distinguished Name) of a certificate object is described in the subject 65b as the subject of the certificate. A DN (Distinguished Name) of a CA (Certificate Authority) is described in the issuer 65c as the issuer of the certificate.

In the embodiment, the import request button 66 is clicked when a new certificate is imported, that is, the new certificate is retrieved in the multi-function product 10. The export request button 67 is clicked when there is a certificate to be stored in the PC 30. The delete request button 68 is clicked when there is a certificate to be deleted after the certificate is selected. The detail information display request button 69 is clicked when there is a certificate with detail information to be confirmed after the certificate is selected.

As shown in FIG. 6, when the import request button 66 is clicked, the certificate import page 70 is displayed on the image display unit 32. The certificate import page 70 includes a certificate selection list 71 and a transmission button 72. The selection list 71 displays a list of files having a format of certificates selected at the PC 30, so that the operator selects a certificate to be imported. When the transmission button 72 is clicked, the file selected on the certificate selection list 71 is sent to the multi-function product 10.

As shown in FIG. 7, when the import request button 66 is clicked, the certificate detail information page 75 is displayed on the image display unit 32. The certificate detail information page 75 includes a detail information table 76 and a page close request button 77. The detail information table 76 includes a certificate number 76a indicating a number of a certificate in the multi-function product 10; a common name 76b as a common name of an issuer; an organization 76c as an organization name of the issuer; an organizational unit 76d as a unit of the issuer; key information 76e as information of a key included in a certificate; a certificate valid period start 76f indicating a start of validity of a certificate; and a certificate valid period end 76g indicating an end of the validity of the certificate.

In the embodiment, when detail information of a certificate is confirmed, the operator clicks the page close request button 77 to close the certificate detail information page 75.

A "Scan To E-mail" function will be explained next as an example of setting the processing function of the multi-function product 10. With the "Scan To E-mail" function, a scanned image is sent with an e-mail.

As shown in FIG. 8, the processing function setting page 80 is displayed on the image display unit 32 of the PC 30. The processing function setting page 80 includes a mail server destination form column 81 and an encryption setting column 82. A destination of the mail server 40 is input in the mail server destination form column 81 for relaying when the "Scan To E-mail" function is used in the multi-function product 10.

In the embodiment, the encryption setting column 82 includes an encryption setting pull down menu 82a; a certificate selection pull down menu 82b; and a certificate list display request button 82c. With the certificate selection pull down menu 82b, an encryption setting is switched between valid and invalid. When the encryption setting is switched to valid, an encryption using a certificate is applied to the "Scan To E-mail". With the certificate selection pull down menu 82b, a certificate is selected from certificates stored in the certificate storage unit 16 of the multi-function product 10 for using encryption communication of the "Scan To E-mail" function.

In the embodiment, numbers of the certificates currently stored in the certificate storage unit 16 are displayed in a pull down list of the certificate selection pull down menu 82b. A number of a certificate is selected in the certificate selection pull down menu 82b, and the number corresponds to a number of the certificate number 65a. When a certificate stored in the certificate storage unit 16 of the multi-function product 10 is confirmed, the certificate list display request button 82c is clicked to request the certificate list 65.

In the embodiment, the authentication encryption communication unit 14 of the multi-function product 10 performs communication with a communication processing function for authentication and encryption using a certificate. An encryption communication method includes, for example, SSL (Secure Socket Layer)/TLS (Transport Layer Security). An authentication communication method includes, for example, IEEE802.1x.

In the embodiment, the processing function information storage unit 15 stores information corresponding to a certificate with respect to a processing function to be adopted in the multi-function product 10 upon performing the authentication communication and the encryption communication.

As shown in FIG. 9, the processing function information storage unit 15 includes a certificate table 15a and a processing function table 15b. A processing function in the processing function table 15b corresponding to a certificate in the certificate table 15a is changed or updated according to the setting information received at the configuration information communication unit 13. Further, the certificate storage unit 16 stores information and the certificate received at the configuration information communication unit 13.

In the embodiment, the network communication unit 17 receives and sends network communication data used for processing in the configuration information communication unit 13, the authentication encryption communication unit 14, and other units with respect to the LAN 50. Further, the network communication unit 17 includes a plurality of protocols including SMTP (Simple Mail Transfer Protocol), FTP (File Transfer Protocol), POP (Post Office Protocol) used for receiving print data, LDAP (Lightweight Directory Access Protocol) used for receiving user information, and the likes.

In the embodiment, the printing unit 18 performs a printing operation after the control unit 20 converts the print data received at the network communication unit 17 to a print image. The facsimile communication unit 19 sends an image read at the image reading unit 12 after the control unit 20 converts the image to a facsimile transmission image.

In the embodiment, the operation unit 11, the image reading unit 12, the configuration information communication unit 13, the authentication encryption communication unit 14, the processing function information storage unit 15, the certificate storage unit 16, the network communication unit 17, the printing unit 18, and the facsimile communication unit 19 are connected to the control unit 20 through a signal line, so that the control unit 20 controls an entire operation of the multi-function product 10.

In the embodiment, the multi-function product 10 is capable of performing a plurality of functions such as the transmission of the image scanned with the image reading unit 12 through the protocols of the network communication unit 17; the printing operation of the image scanned with the image reading unit 12 through the printing unit 18; the facsimile transmission of the image scanned with the image reading unit 12 through the facsimile communication unit 19; the printing operation of the data received with the image reading unit 12 through the printing unit 18; and the printing operation of the data received with the facsimile communication unit 19 through the printing unit 18.

In the embodiment, the setting information communication unit 31 of the PC 30 performs communication of the setting information with the configuration information communication unit 13 of the multi-function product 10. When the operator requests to obtain a web page for setting, for example, the setting information communication unit 31 sends the request to the configuration information communication unit 13 of the multi-function product 10, so that the setting information communication unit 31 receives the web page from the configuration information communication unit 13 of the multi-function product 10.

In the embodiment, the image display unit 32 displays an image for confirming or changing the setting of the multi-function product 10, and displays the web page received at the setting information communication unit 31. The input unit 33 receives a change in the setting from the operator, and includes an input device such as a mouse and a keyboard. The certificate storage unit 34 stores information of the certificate to be sent to the configuration information communication unit 13 of the multi-function product 10. The information of the certificate stored in the certificate storage unit 34 is sent to the configuration information communication unit 13 of the multi-function product 10 from the setting information communication unit 31.

In the embodiment, the setting information communication unit 31, the image display unit 32, the input unit 33, and the certificate storage unit 34 are connected to the control unit 35 through a signal line, so that the control unit 35 controls an entire operation of the PC 30.

Figure 10:
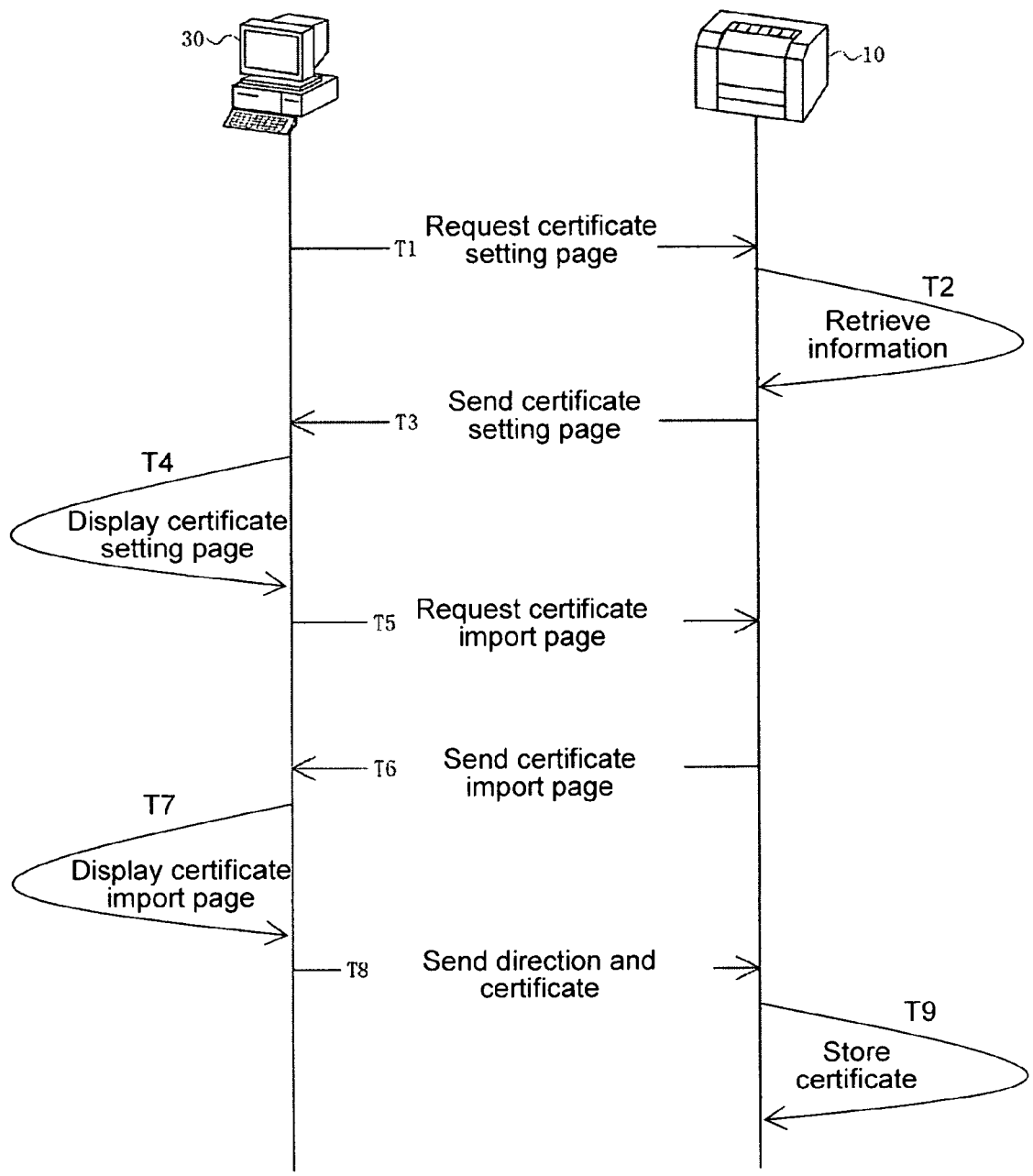
FIG. 10 is a schematic view showing a sequence of an operation of importing a certificate according to the first embodiment of the present invention.

An operation of the image processing system will be explained. First, an operation of the setting of importing the certificate through a web page between the multi-function product 10 and the PC 30 will be explained. FIG. 10 is a schematic view showing a sequence of an operation of importing the certificate according to the first embodiment of the present invention.

At time T1, when an URL (Uniform Resource Locator) of the multi-function product 10 and a certificate setting page are specified on a web browser in the PC 30, the PC 30 requests the certificate setting page. At time T2, when the multi-function product 10 receives the request of the certificate setting page, the multi-function product 10 retrieves information contained in the certificate setting page. At time T3, the multi-function product 10 sends the certificate setting page to the PC 30. At time T4, when the PC 30 receives the certificate setting page from the multi-function product 10, the certificate setting page is opened on the web browser in the PC 30, thereby displaying the certificate setting page.

Figure 11:
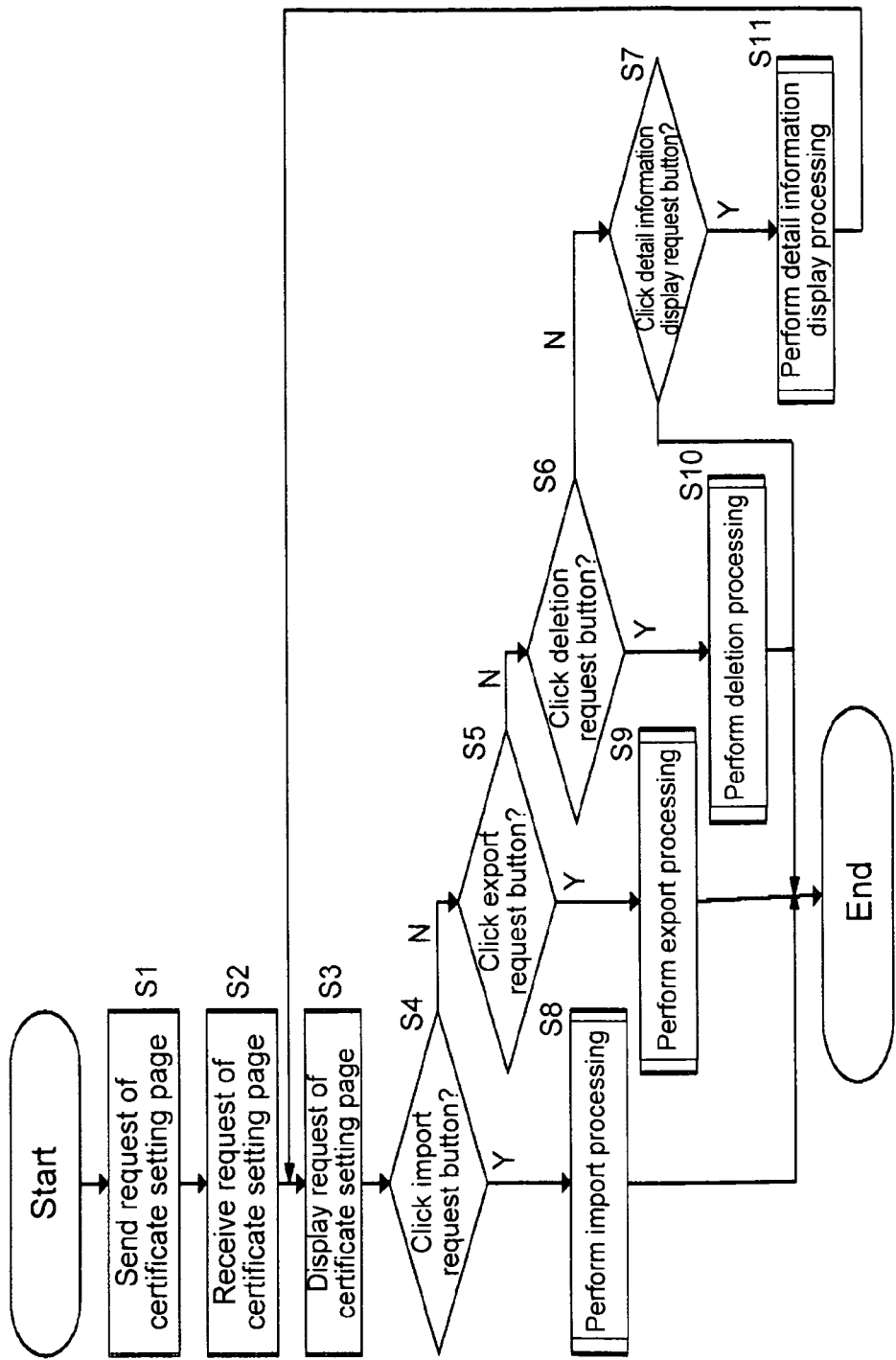
FIG. 11 is a flow chart showing an operation of the PC for setting a certificate according to the first embodiment of the present invention.

An operation of the PC 30 will be explained next. FIG. 11 is a flow chart showing the operation of the PC 30 for setting the certificate according to the first embodiment of the present invention.

When the URL of the multi-function product 10 and the certificate setting page are specified on the web browser, the PC 30 starts HTTP (Hypertext Transfer Protocol) communication to send the request of the certificate setting page. When the PC 30 receives the certificate setting page in the HTML (Hypertext Markup Language) format, the PC 30 displays the certificate setting page on the web browser.

In the next step, the PC 30 determines whether an import request button is clicked. When the import request button is clicked, the PC 30 performs an import processing. When the import request button is not clicked, the PC 30 determines whether an export request button is clicked. When the export request button is clicked, the PC 30 performs an export processing. When the export request button is not clicked, the PC 30 determines whether a deletion request button is clicked. When the deletion button is clicked, the PC 30 performs a deletion processing.

When the export request button is not clicked, the PC 30 determines whether a detail information display request button is clicked. When the detail information display request is clicked, the PC 30 performs a detail information display request processing. When the detail information display request is not clicked, the PC 30 displays the certificate setting page on the web browser, and repeats the steps described above.

The flow chart shown in FIG. 10 will be explained next. In step S1, the request of the certificate setting page is sent. In step S2, the request of the certificate setting page is received. In step S3, the certificate setting page is displayed on the web browser. In step S4, it is determined whether the import request button is clicked. When the import request button is clicked, the process proceeds to step S8. When the import request button is not clicked, the process proceeds to step S5.

In step S5, it is determined whether the export request button is clicked. When the export request button is clicked, the process proceeds to step S9. When the export request button is not clicked, the process proceeds to step S6. In step S6, it is determined whether the deletion request button is clicked. When the deletion button is clicked, the process proceeds to step S10. When the deletion button is not clicked, the process proceeds to step S7.

In step S7, it is determined whether the detail information display request button is clicked. When the detail information display request is clicked, the process proceeds to step S11. When the detail information display request is not clicked, the process returns to step S3. In step S8, the import processing is performed. In step S9, the export processing is performed. In step S10, the deletion processing is performed. In step S11, the detail information display processing is performed.

Figure 12:
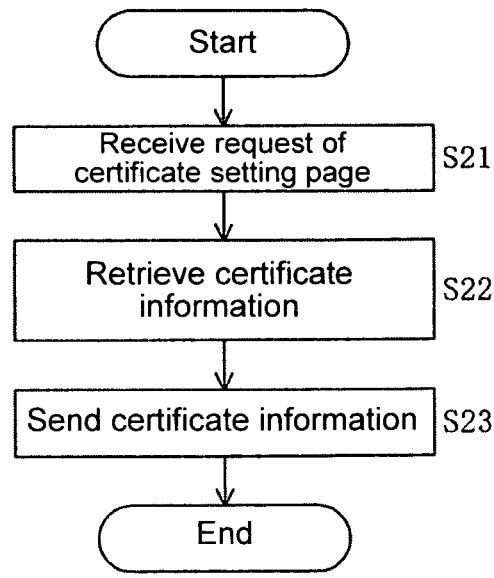
FIG. 12 is a flow chart showing an operation of the multi-function product for setting the certificate according to the first embodiment of the present invention.

An operation of the multi-function product 10 for setting the certificate will be explained next. FIG. 12 is a flow chart showing the operation of the multi-function product 10 for setting the certificate according to the first embodiment of the present invention.

First, the multi-function product 10 receives the request of the certificate setting page sent from the PC 30 through the HTTP communication. Then, the multi-function product 10 retrieves the certificate information stored in the certificate storage unit 16, and sends the web page with the HTML format created according to the certificate information thus retrieved to the PC 30.

The flow chart shown in FIG. 12 will be explained next. In step S21, the request of the certificate setting page is received from the PC 30. In step S22, the certificate information stored in the certificate storage unit 16 is retrieved. In step S23, the web page with the HTML format created according to the certificate information thus retrieved is sent to the PC 30.

An operation of importing the certificate stored in the PC 30 to the multi-function product 10 will be explained next with reference to FIG. 10. At time T5, when the operator clicks the import request button 66 shown in FIG. 5, the PC 30 sends a request of a certificate import page to the multi-function product 10. At time T6, when the multi-function product 10 receives the request of the certificate import page, the multi-function product 10 sends the certificate import page to the PC 30. At time T7, when the PC 30 receives the certificate import page, the certificate import page is displayed on the web browser in the PC 30. At time T8, when the transmission button 72 shown in FIG. 6 is clicked, the PC 30 sends a direction of the certificate import and the certificate to be imported to the multi-function product 10. At time T9, when the multi-function product 10 receives the certificate to be imported, the multi-function product 10 stores the certificate in the certificate storage unit 16.

Figure 13:
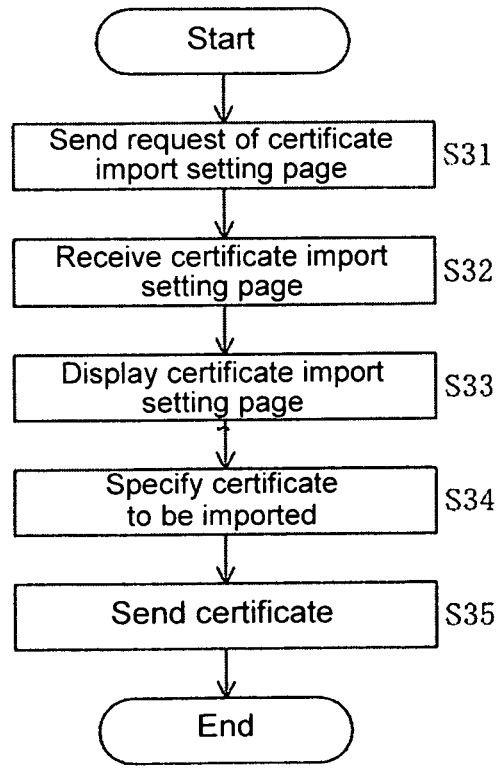
FIG. 13 is a flow chart showing an operation of the PC for importing the certificate according to the first embodiment of the present invention.

An operation of the PC 30 for importing the certificate will be explained next. FIG. 13 is a flow chart showing the operation of the PC 30 for importing the certificate according to the first embodiment of the present invention.

First, the PC 30 sends the request of the certificate import page to the multi-function product 10. When the PC 30 receives the certificate import page from the multi-function product 10, the PC 30 performs a file search with a certificate format therein, and displays the certificate import setting page. When the operator specifies the certificate to be imported and clicks the transmission button, the PC 30 sends the certificate to the multi-function product 10.

The flow chart shown in FIG. 13 will be explained next. In step S31, the request of the certificate import page is sent to the multi-function product 10. In step S32, the certificate import page is received from the multi-function product 10. In step S33, the certificate import setting page is displayed. In step S34, the operator specifies the certificate to be imported. In step S35, the certificate is sent to the multi-function product 10.

Figure 14:
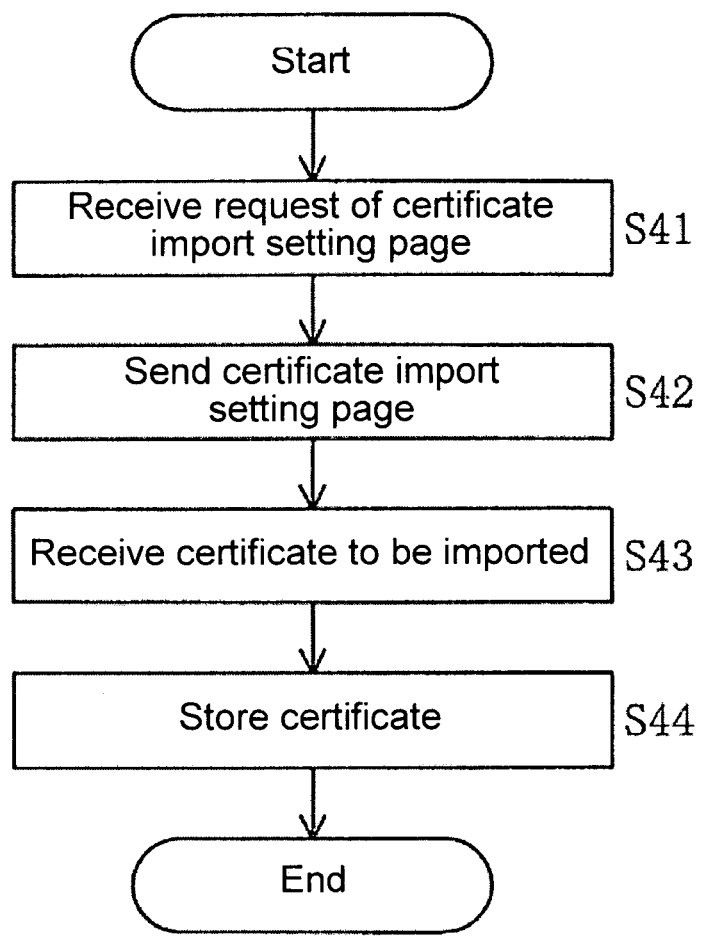
FIG. 14 is a flow chart showing an operation of the multi-function product for importing the certificate according to the first embodiment of the present invention.

An operation of the multi-function product 10 for importing the certificate will be explained next. FIG. 14 is a flow chart showing the operation of the multi-function product 10 for importing the certificate according to the first embodiment of the present invention.

First, when the multi-function product 10 receives the request of the certificate import setting page, the multi-function product 10 sends the certificate import setting page to the PC 30. When the multi-function product 10 receives the certificate to be imported from the PC 30, the multi-function product 10 stores the certificate.

The flow chart shown in FIG. 14 will be explained next. In step S41, the request of the certificate import setting page is received. In step S42, the certificate import setting page is sent to the PC 30. In step S43, the certificate to be imported is received. In step S44, the certificate is stored.

Figure 15:
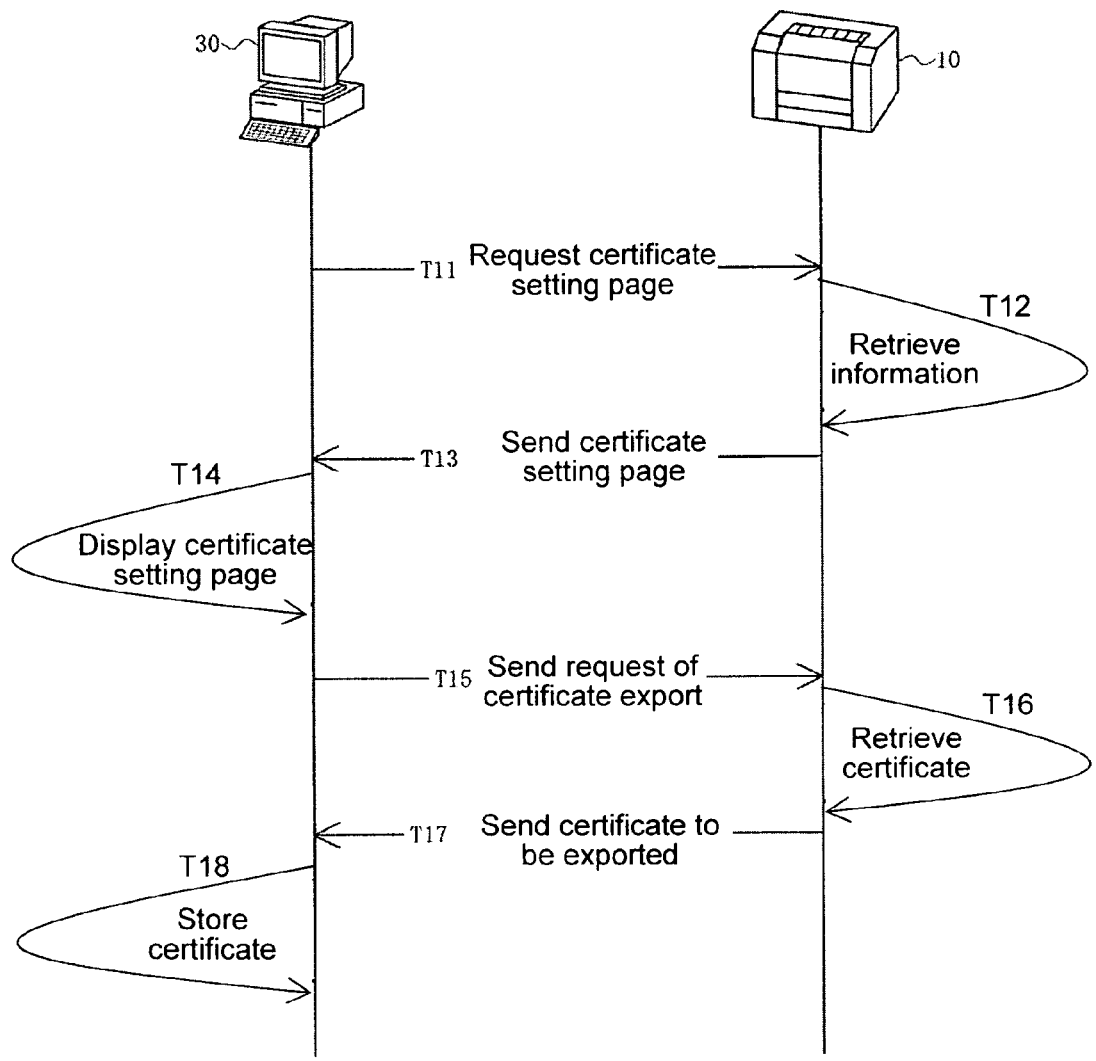
FIG. 15 is a schematic view showing a sequence of an operation of exporting a certificate according to the first embodiment of the present invention.

An operation of exporting the certificate stored in the multi-function product 10 to the PC 30 will be explained next. FIG. 15 is a schematic view showing a sequence of the operation of exporting the certificate according to the first embodiment of the present invention.

An operation (from time T11 to time T14), in which the PC 30 sends the request of the certificate setting page, and the certificate setting page is opened and displayed on the web browser in the PC 30, is the same as the operation of importing the certificate shown in FIG. 10 (from time T1 to time T4), in which the PC 30 sends the request of the certificate setting page, and the certificate setting page is opened and displayed on the web browser in the PC 30. Accordingly, an explanation thereof is omitted.

After time T14, the operator selects the certificate to be stored in the PC 30 from the certificate list 65 of the certificate setting page 64 displayed on the image display unit 32 of the PC 30. Then, the operator clicks the export request button 67.

At time T15, the PC 30 sends the request of the certificate export specified by the operator to the multi-function product 10. At time T16, when the multi-function product 10 receives the request of the certificate export, the multi-function product 10 retrieves the certificate thus specified from the certificate storage unit 16. At time T17, the multi-function product 10 sends the certificate to be exported to the PC 30. At time T18, when the PC 30 receives the certificate from the multi-function product 10, the PC 30 stores the certificate in the certificate storage unit 34.

Figure 16:
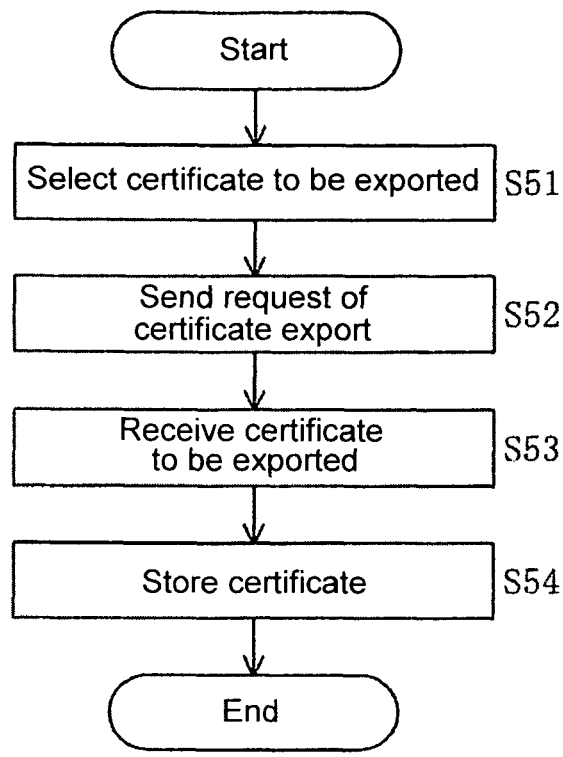
FIG. 16 is a flow chart showing an operation of the PC for exporting the certificate according to the first embodiment of the present invention.

An operation of the PC 30 for exporting the certificate will be explained next. FIG. 16 is a flow chart showing the operation of the PC 30 for exporting the certificate according to the first embodiment of the present invention.

First, the operator selects the certificate to be exported. When the operator clicks the transmission button, the PC 30 sends the request of the certificate export to the multi-function product 10. When the PC 30 receives the certificate to be exported from the multi-function product 10, the PC 30 stores the certificate in the certificate storage unit 34.

The flow chart shown in FIG. 16 will be explained next. In step S51, the operator selects the certificate to be exported. In step S52, the request of the certificate export is sent to the multi-function product 10. In step S53, the certificate to be exported is received. In step S54, the certificate is stored in the certificate storage unit 34.

Figure 17:
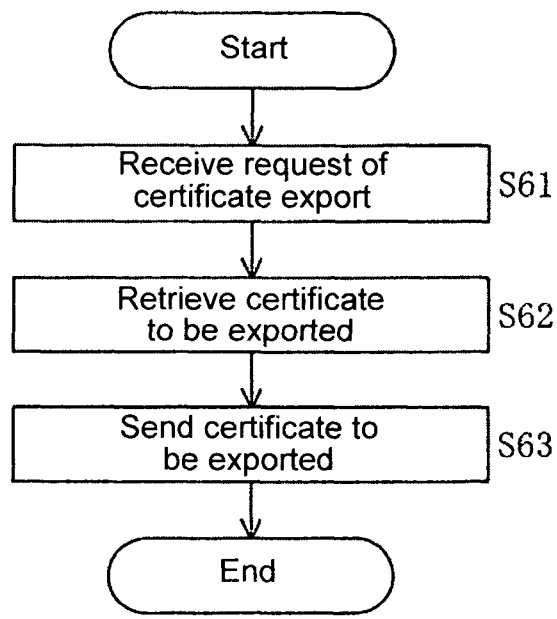
FIG. 17 is a flow chart showing an operation of the multi-function product for exporting the certificate according to the first embodiment of the present invention.

An operation of the multi-function product 10 for exporting the certificate will be explained next. FIG. 17 is a flow chart showing the operation of the multi-function product 10 for exporting the certificate according to the first embodiment of the present invention.

First, the multi-function product 10 receives the request of the certificate export from the PC 30. Then, the multi-function product 10 retrieves the certificate to be exported from the certificate storage unit 16. At last, the multi-function product 10 sends the certificate to be exported to the PC 30.

The flow chart shown in FIG. 17 will be explained next. In step S61, the request of the certificate export is received from the PC 30. In step S62, the certificate to be exported is retrieved from the certificate storage unit 16. In step S63, the certificate to be exported is sent to the PC 30.

Figure 18:
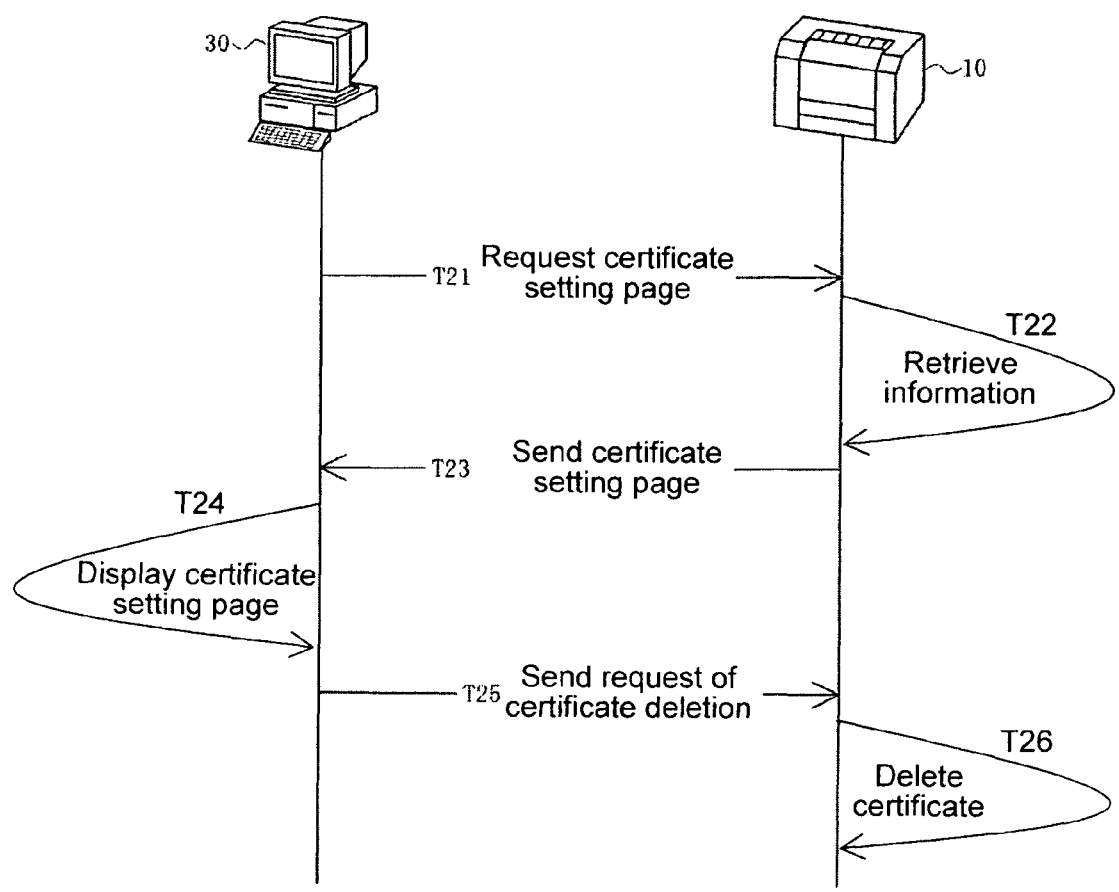
FIG. 18 is a schematic view showing a sequence of an operation of deleting a certificate according to the first embodiment of the present invention.

An operation of deleting the certificate stored in the multi-function product 10 will be explained next. FIG. 18 is a schematic view showing a sequence of the operation of deleting the certificate according to the first embodiment of the present invention.

An operation (from time T21 to time T24), in which the PC 30 sends the request of the certificate setting page, and the certificate setting page is opened and displayed on the web browser in the PC 30, is the same as the operation of importing the certificate shown in FIG. 10 (from time T1 to time T4), in which the PC 30 sends the request of the certificate setting page, and the certificate setting page is opened and displayed on the web browser in the PC 30. Accordingly, an explanation thereof is omitted.

After time T24, the operator selects the certificate to be deleted from the certificate list 65 of the certificate setting page 64 displayed on the image display unit 32 of the PC 30. Then, the operator clicks the delete request button 68.

At time T25, the PC 30 sends the request of the certificate deletion specified by the operator to the multi-function product 10. At time T26, when the multi-function product 10 receives the request of the certificate deletion, the multi-function product 10 deletes the certificate thus specified from the certificate storage unit 16.

Figure 19:
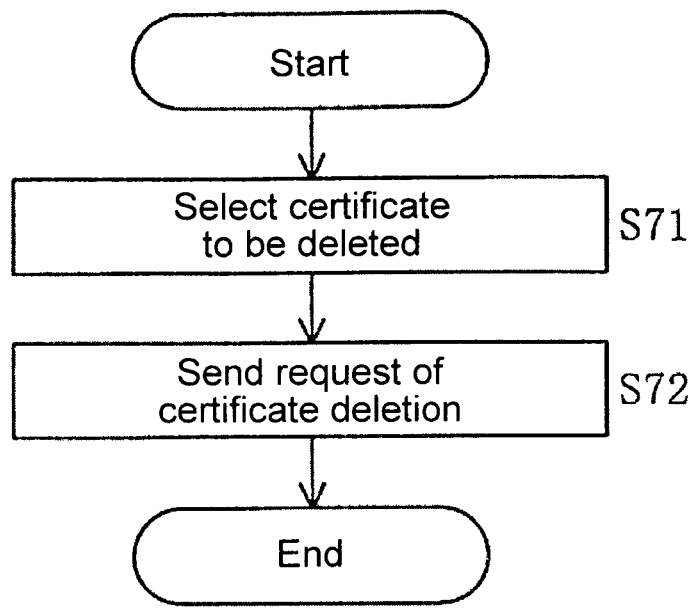
FIG. 19 is a flow chart showing an operation of the PC for deleting the certificate according to the first embodiment of the present invention.

An operation of the PC 30 for deleting the certificate will be explained next. FIG. 19 is a flow chart showing the operation of the PC 30 for deleting the certificate according to the first embodiment of the present invention.

First, the operator selects the certificate to be deleted. When the operator clicks the transmission button, the PC 30 sends the request of the certificate deletion to the multi-function product 10.

The flow chart shown in FIG. 19 will be explained next. In step S71, the operator selects the certificate to be deleted. In step S72, the request of the certificate deletion is sent to the multi-function product 10.

Figure 20:
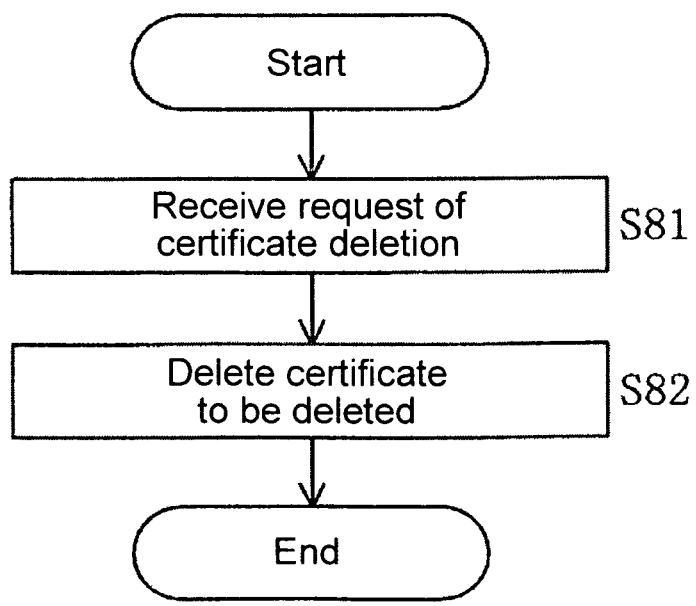
FIG. 20 is a flow chart showing an operation of the multi-function product for deleting the certificate according to the first embodiment of the present invention.

An operation of the multi-function product 10 for deleting the certificate will be explained next. FIG. 20 is a flow chart showing the operation of the multi-function product 10 for deleting the certificate according to the first embodiment of the present invention.

First, the multi-function product 10 receives the request of the certificate deletion from the PC 30. Then, the multi-function product 10 deletes the certificate to be deleted from the certificate storage unit 16.

The flow chart shown in FIG. 20 will be explained next. In step S81, the request of the certificate deletion is received from the PC 30. In step S82, the certificate to be deleted is deleted from the certificate storage unit 16.

Figure 21:
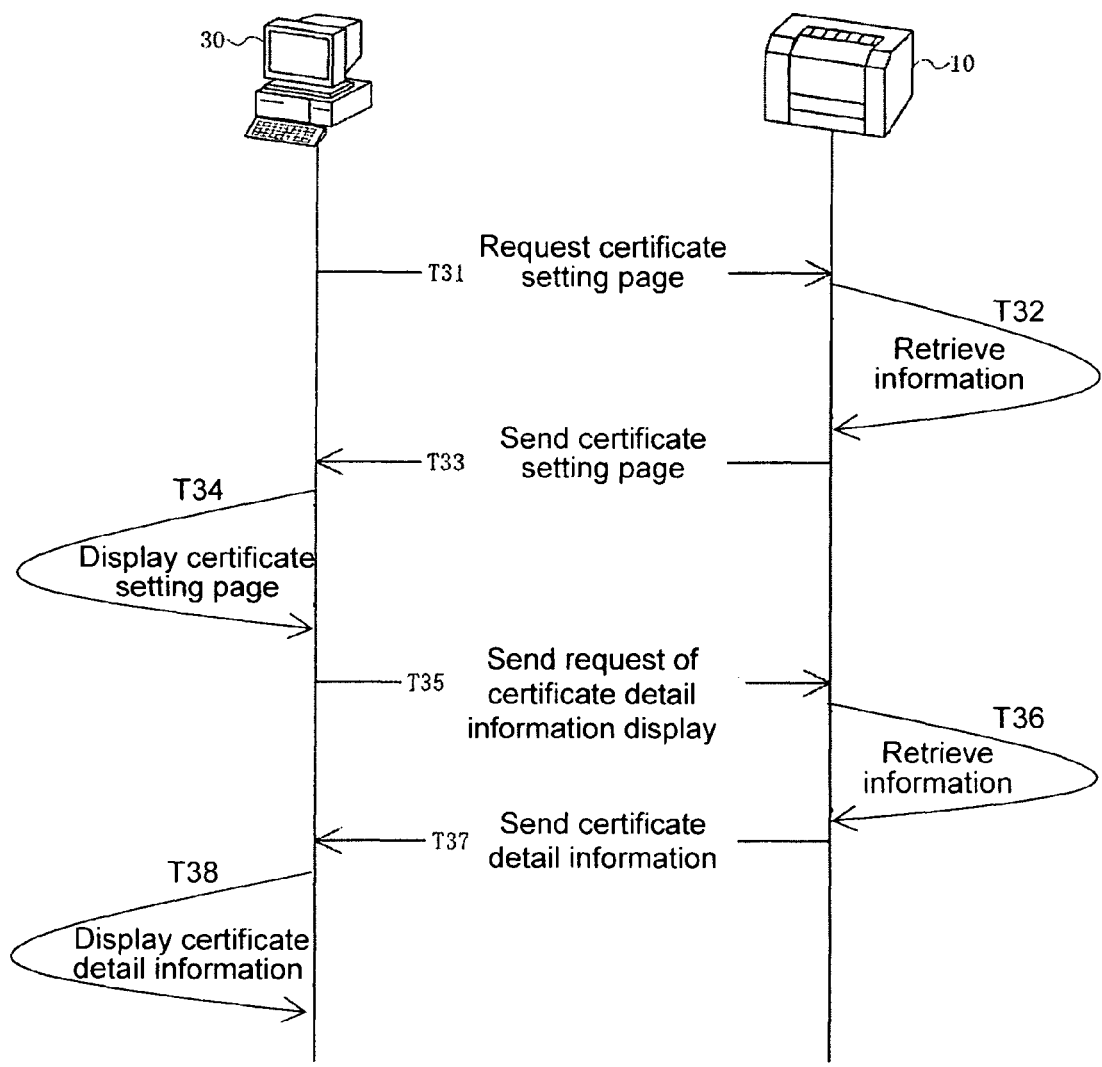
FIG. 21 is a schematic view showing a sequence of an operation of displaying certificate detail information according to the first embodiment of the present invention.

An operation of displaying the certificate detail information stored in the multi-function product 10 will be explained next. FIG. 21 is a schematic view showing a sequence of the operation of displaying the certificate detail information according to the first embodiment of the present invention.

An operation (from time T31 to time T34), in which the PC 30 sends the request of the certificate setting page, and the certificate setting page is opened and displayed on the web browser in the PC 30, is the same as the operation of importing the certificate shown in FIG. 10 (from time T1 to time T4), in which the PC 30 sends the request of the certificate setting page, and the certificate setting page is opened and displayed on the web browser in the PC 30. Accordingly, an explanation thereof is omitted.

After time T34, the operator selects the certificate from the certificate list 65 of the certificate setting page 64 displayed on the image display unit 32 of the PC 30. Then, the operator clicks the detail information display request button 69.

At time T35, the PC 30 sends the request of the certificate detail information display specified by the operator to the multi-function product 10. At time T36, when the multi-function product 10 receives the request of the certificate detail information display, the multi-function product 10 retrieves the certificate detail information thus specified from the certificate storage unit 16. At time T37, the multi-function product 10 sends the certificate detail information thus retrieved to the PC 30. At time T38, when the PC 30 receives the certificate detail information from the multi-function product 10, the PC 30 displays a page of the certificate detail information on the web browser.

Figure 22:
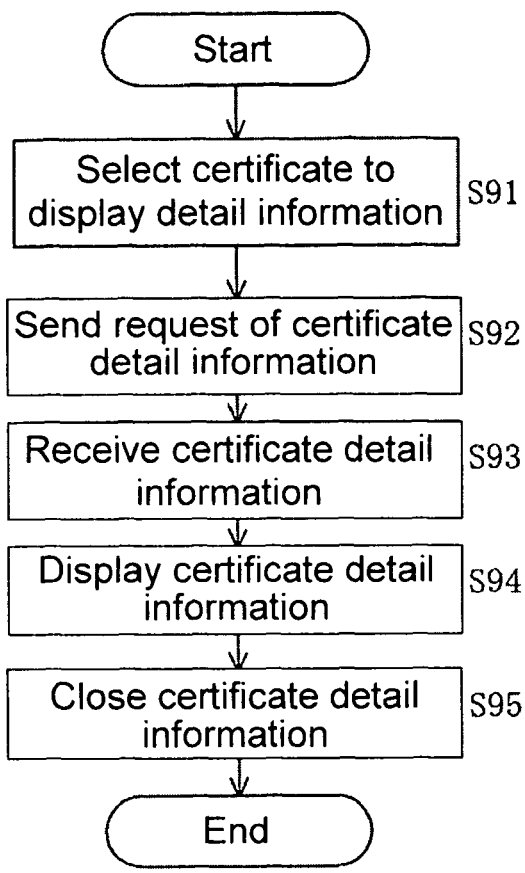
FIG. 22 is a flow chart showing an operation of the PC for displaying the certificate detail information according to the first embodiment of the present invention.

An operation of the PC 30 for displaying the certificate detail information will be explained next. FIG. 22 is a flow chart showing the operation of the PC 31 for displaying the certificate detail information according to the first embodiment of the present invention.

First, the operator selects the certificate to display the detail information thereof. When the operator clicks the transmission button, the PC 30 sends the request of the certificate detail information display to the multi-function product 10. When the PC 30 receives the certificate detail information to be displayed from the multi-function product 10, the PC 30 displays the certificate detail information. When the operator clicks the page close request button 77, the PC 30 stops displaying the certificate detail information.

The flow chart shown in FIG. 22 will be explained next. In step S91, the operator selects the certificate to display the detail information thereof. In step S92, the request of the certificate detail information display is sent to the multi-function product 10. In step S93, the certificate detail information is received. In step S94, the certificate detail information is displayed. In step S95, the certificate detail information is closed.

Figure 23:
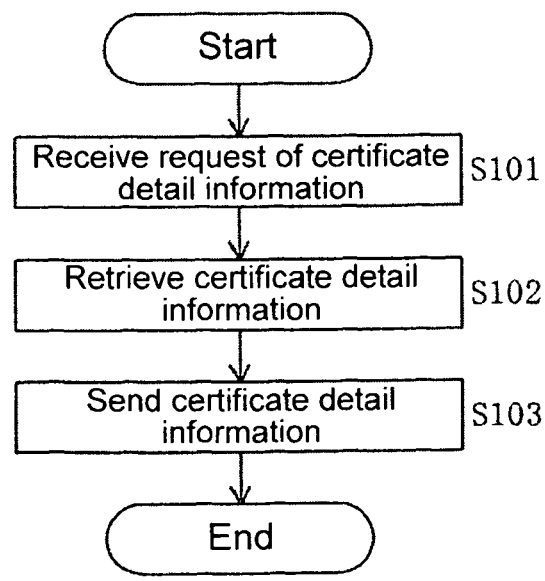
FIG. 23 is a flow chart showing an operation of the multi-function product for displaying the certificate detail information according to the first embodiment of the present invention.

An operation of the multi-function product 10 for displaying the certificate detail information will be explained next. FIG. 23 is a flow chart showing the operation of the multi-function product 10 for displaying the certificate detail information according to the first embodiment of the present invention.

First, the multi-function product 10 receives the request of the certificate detail information display from the PC 30. Then, the multi-function product 10 retrieves the certificate detail information to be displayed from the certificate storage unit 16. At last, the multi-function product 10 converts the certificate detail information to the format of the page of the certificate detail information, and sends the certificate detail information to the PC 30.

The flow chart shown in FIG. 23 will be explained next. In step S101, the request of the certificate detail information display is received from the PC 30. In step S102, the certificate detail information to be displayed is retrieved from the certificate storage unit 16. In step S103, the certificate detail information is converted to the format of the page of the certificate detail information, and is sent to the PC 30.

Figure 24:
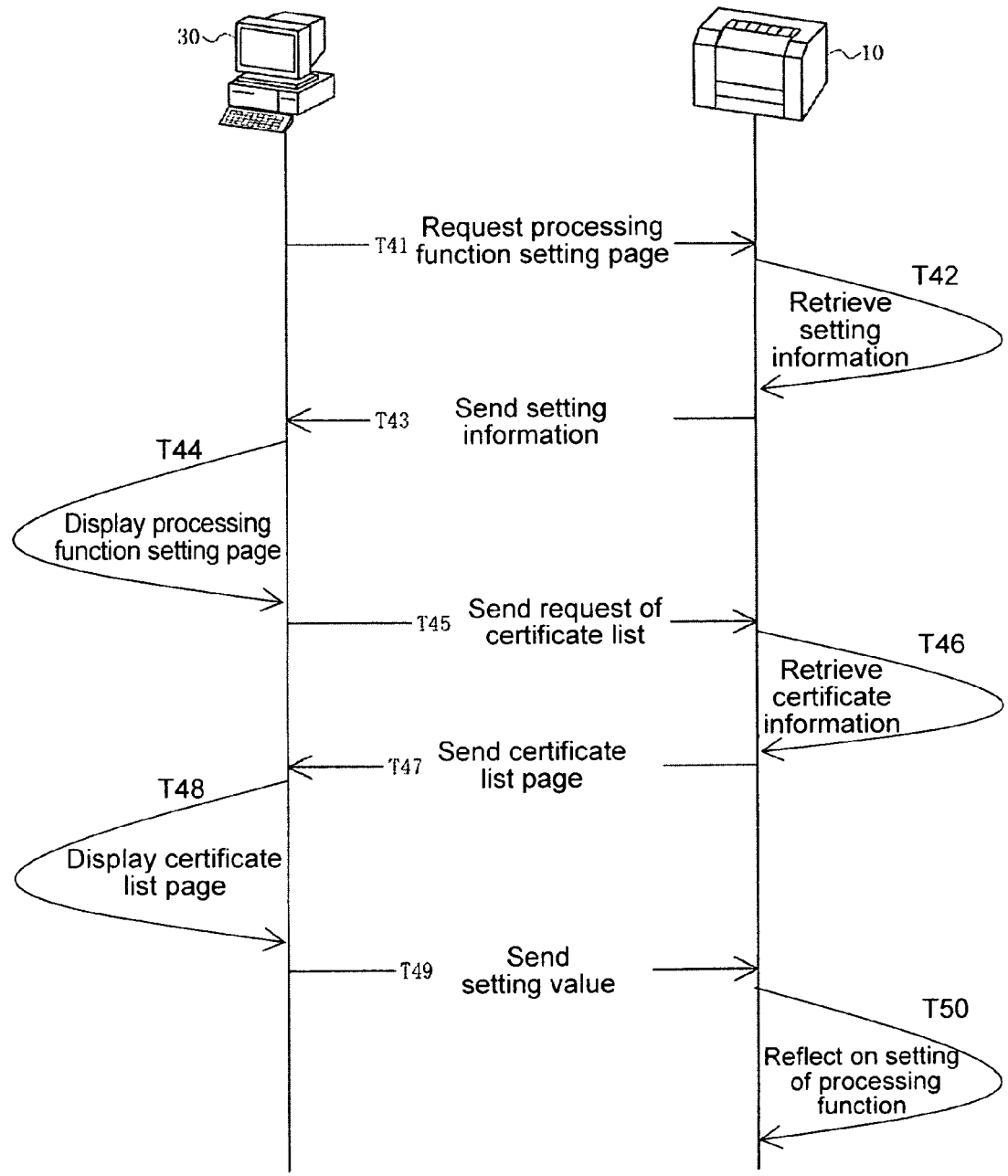
FIG. 24 is a schematic view showing a sequence of an operation of setting the certificate corresponding to a processing function according to the first embodiment of the present invention.

An operation of the multi-function product 10 for setting the certificate corresponding to the processing function through a web page will be explained next. FIG. 24 is a schematic view showing a sequence of the operation of setting the certificate corresponding to a processing function according to the first embodiment of the present invention.

At time T41, when the operator specifies the URL of the multi-function product 10 and the processing function setting page on the web browser, the PC 30 requests the processing function setting page. At time T42, when the multi-function product 10 receives the request of the processing function setting page, the multi-function product 10 retrieves setting information pertaining to the processing function. At time T43, the multi-function product 10 sends the setting information with the format of the web page to the PC 30. At time T44, when the PC 30 receives the processing function setting page from the multi-function product 10, the processing function setting page is opened on the web browser in the PC 30, thereby displaying the processing function setting page.

At time T45, when the operator clicks the certificate list display request button 82*c* shown in FIG. 8, the PC 30 sends the request of the certificate list. At time T46, when the multi-function product 10 receives the request of the certificate list, the multi-function product 10 retrieves the certificate information for creating the certificate list. At time T47, the multi-function product 10 sends the certificate list page with the web page format to the PC 30 according to the certificate information thus retrieved.

At time T48, when the PC 30 receives the certificate list page, the PC 30 displays the certificate list page on the web browser in the PC 30. The certificate list page has the format shown in FIG. 5. At time T49, after the operator confirms the certificate list 65 if necessary and sets the "Scan To E-mail" function completely, when the operator clicks a transmission button 83, the PC 30 sends a setting value of the "Scan To E-mail" function to the multi-function product 10. At time T50, when the multi-function product 10 receives the setting value of the "Scan To E-mail" function, the multi-function product 10 reflects on the setting of the processing function.

Figure 25:
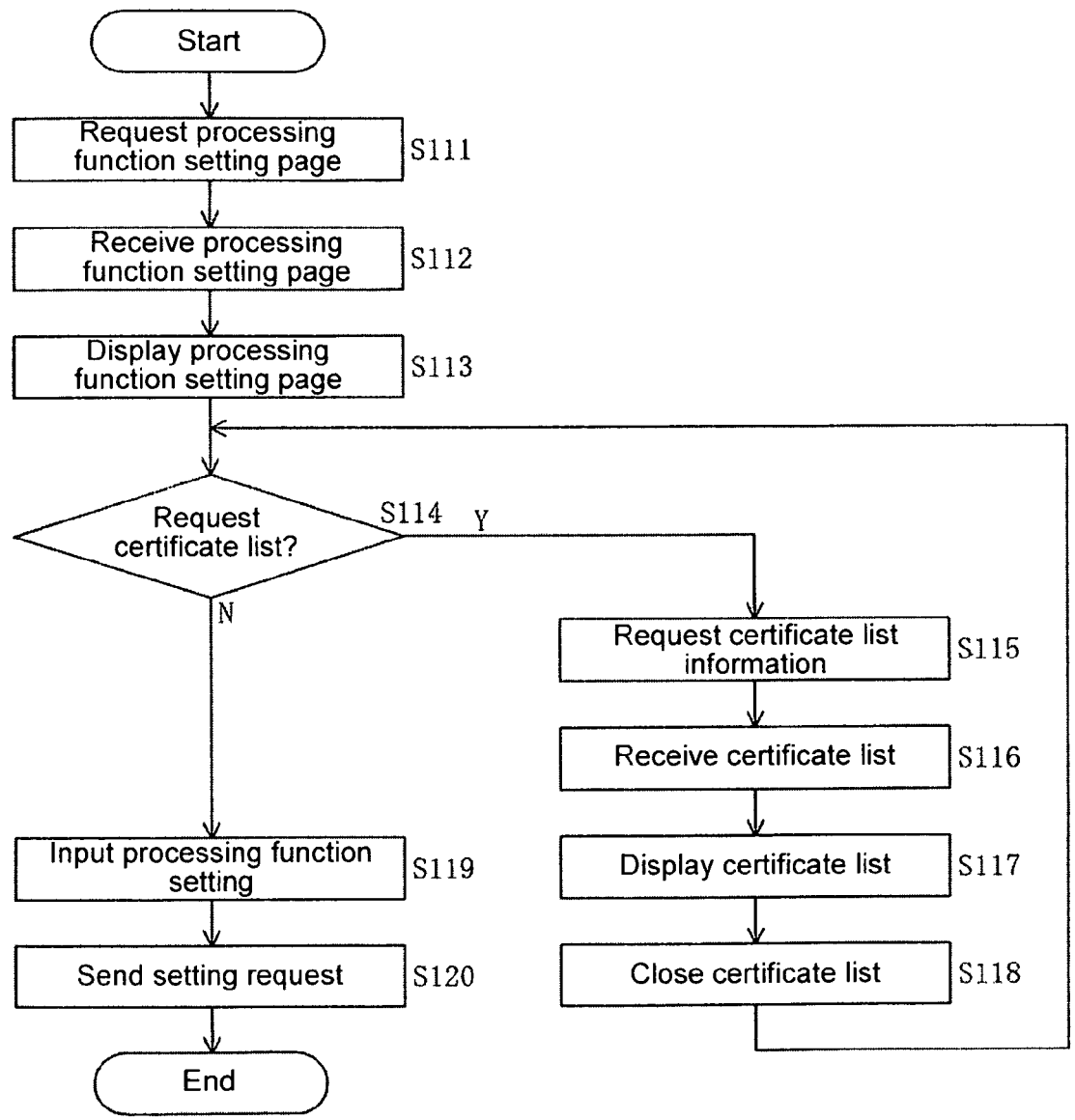
FIG. 25 is a flow chart showing an operation of the PC for setting a "Scan To E-mail" function according to the first embodiment of the present invention.

An operation of the PC 30 for setting the "Scan To E-mail" function will be explained next. FIG. 25 is a flow chart showing an operation of the PC for setting the "Scan To E-mail" function according to the first embodiment of the present invention.

First, the PC 30 requests the processing function setting page. When the PC 30 receives the processing function setting page from the multi-function product 10, the PC 30 displays the processing function setting page. Then, the PC 30 determines whether the operator requests the certificate list. When the operator requests the certificate list, the PC 30 requests certificate list information to the multi-function product 10. When the PC 30 receives the certificate list 65 from the multi-function product 10, the PC 30 displays the certificate list 65. When the operator requests the certificate list 65 to close, the PC 30 stops displaying the certificate list 65. When the operator does not request the certificate list, and the operator inputs the processing function setting and clicks the transmission button 83, the PC 30 sends the setting request.

The flow chart shown in FIG. 25 will be explained next. In step S111, the processing function setting page is requested. In step S112, the processing function setting page is received from the multi-function product 10. In step S113, the processing function setting page is displayed. In step S114, it is determined whether the operator requests the certificate list. When the operator requests the certificate list, the process proceeds to step S115. When the operator does not request the certificate list, the process proceeds to step S119.

In step S115, the certificate list information is requested to the multi-function product 10. In step S116, the certificate list 65 is received from the multi-function product 10. In step S117, the certificate list 65 is displayed. In step S118, the certificate list 65 is closed. In step S119, the operator inputs the processing function setting. In step S120, the setting request is sent.

Figure 26:
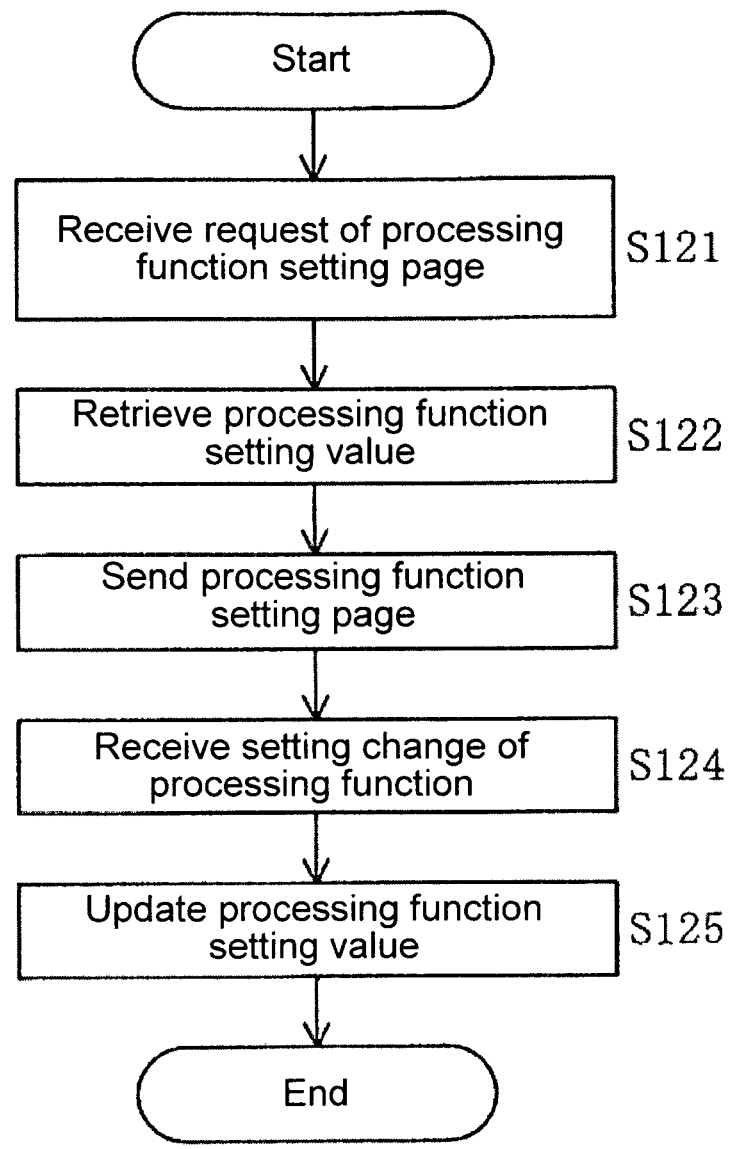
FIG. 26 is a flow chart showing an operation of the multi-function product for setting the "Scan To E-mail" function according to the first embodiment of the present invention.

An operation of the multi-function product 10 for setting the "Scan To E-mail" function will be explained next. FIG. 26 is a flow chart showing the operation of the multi-function product 10 for setting the "Scan To E-mail" function according to the first embodiment of the present invention.

When the multi-function product 10 receives the request of the processing function setting page from the PC 30, the multi-function product 10 retrieves a processing function setting value, and sends the processing function setting value to the PC 30. When the PC 30 completes the setting, and the multi-function product 10 receives a setting change of the processing function from the PC 30, the multi-function product 10 updates the processing function setting value.

The flow chart shown in FIG. 26 will be explained next. In step S121, the request of the processing function setting page is received from the PC 30. In step S122, the processing function setting value is retrieved. In step S123, the processing function setting page is sent to the PC 30. In step S124, the setting change of the processing function is received from the PC 30. In step S125, the processing function setting value is updated.

Figure 27:
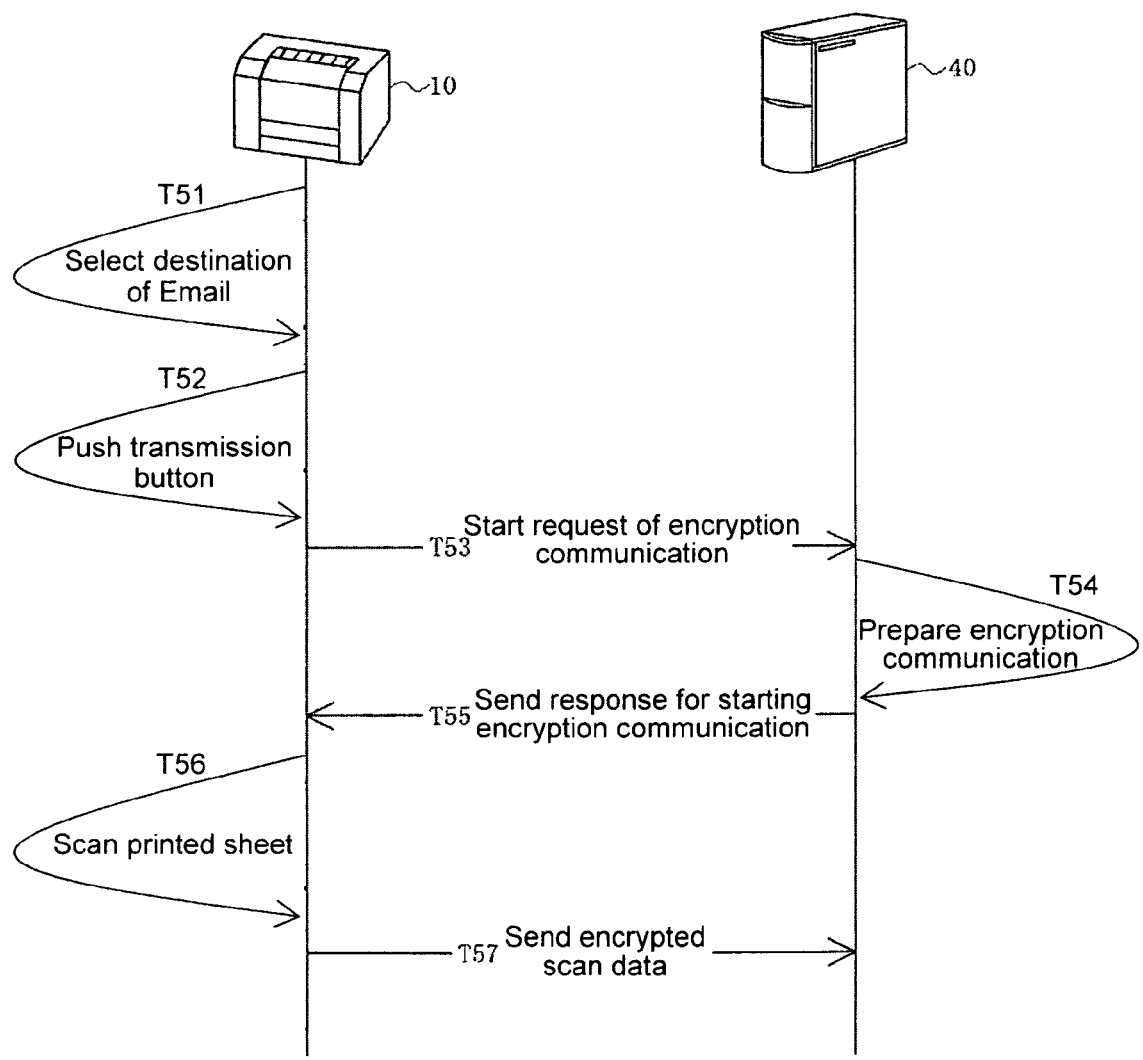
FIG. 27 is a schematic view showing a sequence of an operation of the "Scan To E-mail" function applied with encryption according to the first embodiment of the present invention.

An operation of the "Scan To E-mail" function applied with the encryption will be explained next. FIG. 27 is a schematic view showing a sequence of the operation of the "Scan To E-mail" function applied with the encryption according to the first embodiment of the present invention.

In the embodiment, communication of the "Scan To E-mail" function is set on the operation unit 11 of the multi-function product 10, in which a printed sheet with a scan image, i.e., an image to be read, printed thereon is set in the image reading unit 12. As shown in FIG. 4, the destination setting section 61 and the transmission button 62 are displayed on the operation panel 60 of the operation unit 11.

At time T51, the operator touches one of the destinations displayed in the destination setting section 61 and registered in advance, thereby selecting the destination of an email with the image scanned with the image reading unit 12. At time T52, the operator selects more than one destination and pushes the transmission button 62. At time T53, the multi-function product 10 establishes the TCP connection and sends a start request of the encryption communication to the mail server 40.

When the mail server 40 receives the start request, the mail server 40 sends a server certificate including a public key to the multi-function product 10. The server certificate stores the destination information. When the multi-function product 10 determines that the destination is authentic and reliable to the multi-function product 10 using an authentic destination signature certificate retained in the mail server 40, the multi-function product 10 determines that the mail server 40 is reliable.

Afterward, the mail server 40 sends a common key for encrypting data with the public key in the server certificate to the multi-function product 10 before sending the data. Then, the mail server 40 combines the common key with a self secret key for preparing for next encryption communication. The certificate correlated to the "Scan To E-mail" function is sent to the mail server 40 within the start request of the encryption communication at time T53.

As described above, the mail server 40 prepares for the encryption communication and confirms the certificate at time T54, and sends the response for starting the encryption communication at time T55. At time T56, when the multi-function product 10 receives the response for starting the encryption communication, the multi-function product 10 determines that the communication is ready and scans the printed sheet set in the image reading unit 12. At time T57, the multi-function product 10 sends encrypted scan data, i.e., data of the image scanned with the image reading unit 12, to the mail server 40, thereby completing the process. The certificate for the "Scan To E-mail" function is used for the mail server 40 to authenticate the originator of the mail.

Figure 28:
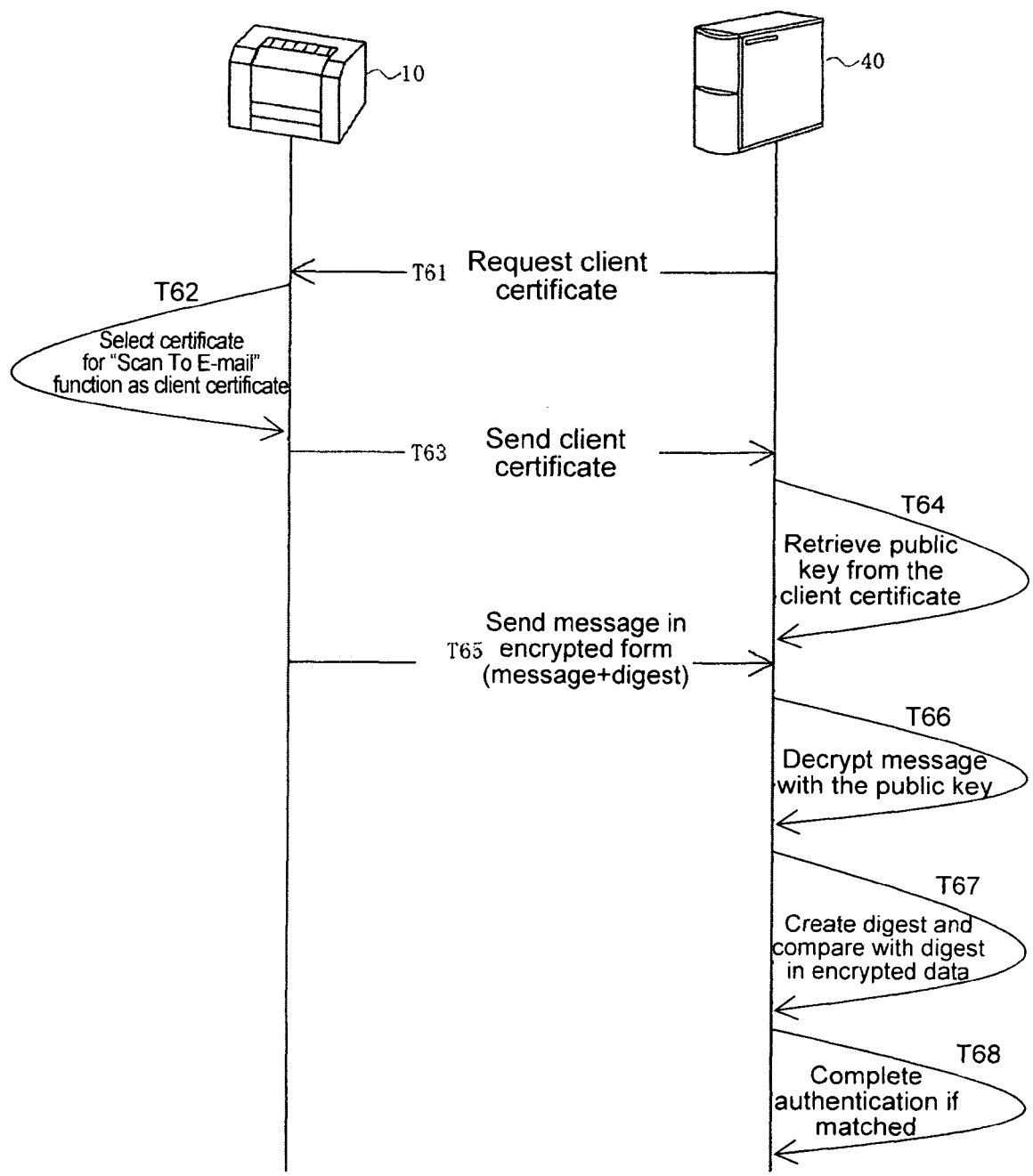
FIG. 28 is a schematic view showing a sequence of an operation of using the certificate for the "Scan To E-mail" function according to the first embodiment of the present invention.

An operation of using the certificate for the "Scan To E-mail" function will be explained next. FIG. 28 is a schematic view showing a sequence of the operation of using the certificate for the "Scan To E-mail" function according to the first embodiment of the present invention.

At time T61, the mail server 40 requests a client certificate. At time T62, the operation panel 60 selects the certificate for the "Scan To E-mail" function as the client certificate. At time T63, the multi-function product 10 sends the client certificate to the mail server 40. At time T64, the mail server 40 retrieves a public key from the client certificate thus received. A client is authenticated when the encrypted data are actually received.

At time T65, the multi-function product 10 adds a digest created from a message to the message, and sends the message in an encrypted form to the mail server 40. At time T66, when the mail server 40 receives the encrypted data, i.e., the encrypted message, the mail server 40 decrypts the message with the public key obtained at time T64. At time T67, the mail server 40 creates a digest with the same method as the multi-function product 10 does from the message thus decrypted, and compares the digest with the digest included in the encrypted data. When the two digests are matched, it is determined that the encrypted data received at time T65 are those of the multi-function product 10, thereby completing the authentication.

Figure 29:
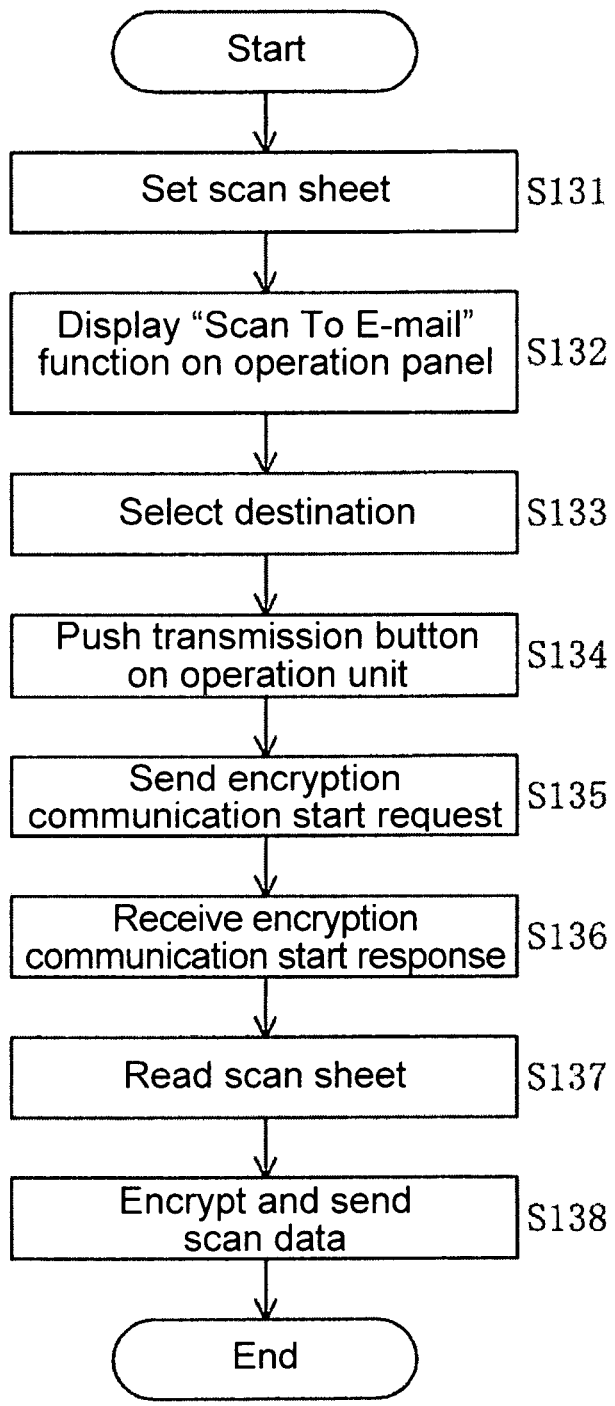
FIG. 29 is a flow chart showing an operation of the multi-function product for communicating in the "Scan To E-mail" function according to the first embodiment of the present invention.

An operation of the multi-function product 10 for communicating in the "Scan To E-mail" function will be explained next. FIG. 29 is a flow chart showing the operation of the multi-function product 10 for communicating in the "Scan To E-mail" function according to the first embodiment of the present invention.

When a scan sheet with a scan image, i.e., an image to be read, printed thereon is set in the image reading unit 12, a screen of the "Scan To E-mail" function is displayed on the operation panel 60 of the operation unit 11. When the operator selects the destination and pushes the transmission button 62 on the operation unit 11, the multi-function product 10 sends an encryption communication start request to the mail server 40.

When the multi-function product 10 receives an encryption communication start response from the mail server 40, the multi-function product 10 reads the image of the scan sheet, and encrypts and sends the scan data to the mail server 40.

The flow chart shown in FIG. 29 will be explained next. In step S131, the scan sheet is set in the image reading unit 12. In step S132, the screen of the "Scan To E-mail" function is displayed on the operation panel 60 of the operation unit 11. In step S133, the operator selects the destination through the operation unit 11. In step S134, the transmission button 62 on the operation unit 11 is pushed. In step S135, the encryption communication start request is sent to the mail server 40. In step S136, the encryption communication start response is received from the mail server 40. In step S137, the image of the scan sheet is read. In step S138, the scan data are encrypted and sent to the mail server 40.

In the embodiment, when the "Scan To E-mail" function is used, the multi-function product 10 is operated as the client of the encryption communication, so that the certificate is used as the client certificate. Depending on the processing function, the multi-function product 10 may be operated as a server of the encryption communication. At this time, the certificate is used as a server certificate. Further, when the function of authenticating a communication mate is used, a certificate of an authenticated device, i.e., an originator of a certificate of the communication mate, may be used.

In the embodiment, the certificate does not include individual information identifying an individual. The certificate may include individual information, and the processing function information storage unit 15 may be configured such that the certificate table 15*a* and the processing function table 15*b* are correlated to the individual information.

An example of the certificate will be explained next. FIG. 30 is a schematic view showing the example of the certificate according to the first embodiment of the present invention.

In the certificate 90, a version 91 identifies a version of the X.509 standard. A serial number 92 is a number for differentiating the issuer of the certificate 90 from other certificates issued by the issuer. A signature algorism 93 represents an algorism used for attaching a signature of the issuer. The certificate 90 uses a signature algorism of the md5WithRSAEEncryption type. A DN (Distinguished Name) of a CA (Certificate Authority) is described in the issuer as the issuer of the certificate.

In the certificate 90, an issuer name 94 indicates an X.500 name of the issuer who puts the signature to the certificate 90. A valid period 95 indicates a valid period of the certificate 90. The certificate 90 is valid only for a period of time indicated with the valid period 95.

In the certificate 90, a subject 96 indicates the public key and an owner name of the certificate thereof. A public key algorism 97 represents an algorism of the public key encryption. The certificate 90 uses an rsa public key encryption algorism. A public key 98 stores a public key body. The certificate 90 retains the public key having a key size of 1,024 bit with the rsa public key encryption algorism. A DN (Distinguished Name) of an owner of the public key 98 is described in the subject 96 as the subject of the certificate.

A modified example of the embodiment will be explained next. In the embodiment described above, anyone can use the functions correlated to the certificate, thereby allowing unlimited usage. When a configuration of the modified example described below is adopted, it is possible to limit the functions usable per operator through using an operator name input in a column of the public key owner 96.

In the modified example, the multi-function product 10 further includes an operation unit capable of inputting an operator name and a password; a display unit for displaying an input content and usable functions; and a storage table for storing in advance such that the operator name set in the certificate is correlated to account information including the password of the operator. In the processing function information storage unit 15, the account information of the certificate is listed in the certificate table 15*a* instead of the certificate number, thereby correlating to the processing function table 15*b* specifying the usable functions.

An operation of the multi-function product 10 in the modified example will be explained when the operator uses the certificate 90 to read an image. When the operator uses the image reading function of the multi-function product 10, the operator sends the certificate 90 issued to the operator in advance to the multi-function product 10. Then, the operator inputs the operator name and the password through a setting button of the operation unit.

In the next step, the control unit 20 of the multi-function product 10 compares the operator name and the password thus input with the account information of the certificate stored in advance in the storage table, thereby determining a difference. When the operator name and the password are matched to the account information, the control unit 20 retrieves the processing function table 15*b* correlating to the operator name of the certificate 90, so that the usable function is displayed on the operation panel 60, thereby proceeding to an input waiting state of the allowed function. When the reading operation is registered in the processing function table 15*b*, the process proceeds to the input waiting state of the reading operation. When the operator name and the password are not matched to the account information, a notice that there is no usable function is displayed on the operation panel 60, thereby prohibiting the reading operation.

As described above, in the modified example, it is possible to separately set the usable function using the operator information set in the certificate 90. Accordingly, it is possible to limit the usable function per operator. An account for an administrator is set in the multi-function product 10. Only when the multi-function product 10 is logged in with the account, it is possible to import the certificate 90. Accordingly, it is possible to prevent an operator other than the administrator from adding the certificate 90.

As described above, in the embodiment, as the function of collectively administrating the certificates stored in the multi-function product 10, the correlation between the processing function and the certificate is output, thereby making it easy for the operator to confirm the correlation. Accordingly, it is possible to confirm the information on which processing function is used as the type of the certificate and the information of the certificate stored but not used.

Further, when the certificate contains the individual information, and the certificate table 15*a* and the processing function table 15*b* are correlated to the individual information, it is possible to limit the usable function per operator.

Second Embodiment

A second embodiment of the present invention will be explained. Components in the second embodiment similar to those in the first embodiment are designated by the same reference numerals, and explanations thereof are omitted. The components and operations in the second embodiment similar to those in the first embodiment provide effects same as those in the first embodiment, and explanations thereof are omitted.

Figure 31:
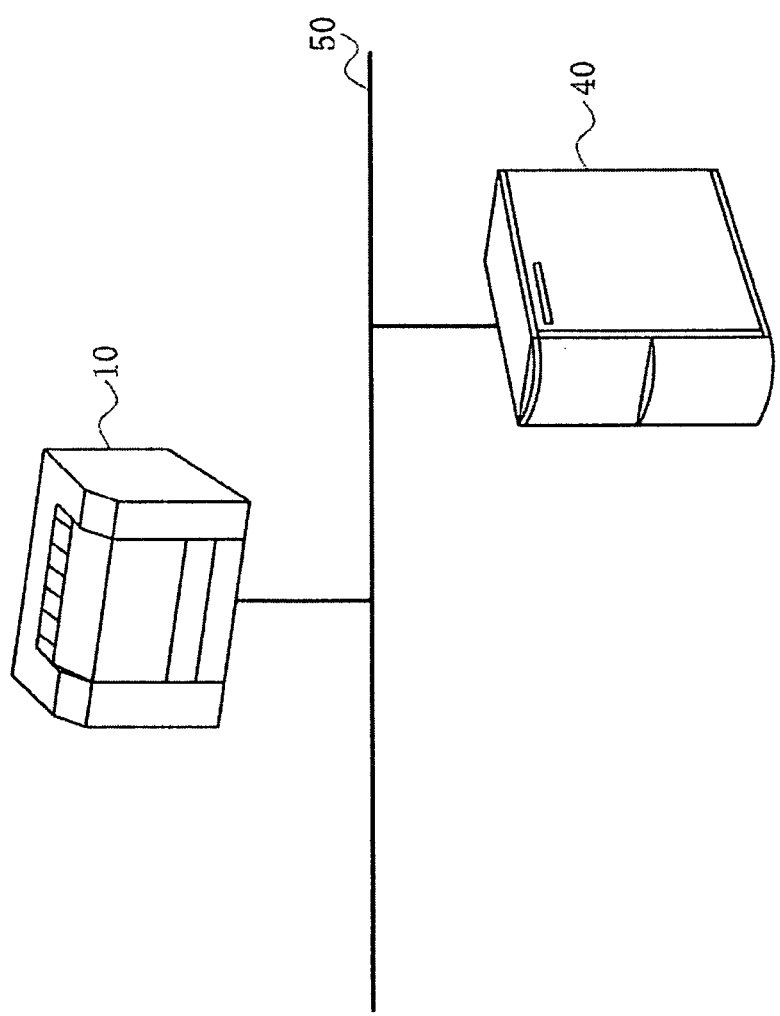
FIG. 31 is a schematic view showing a configuration of an image processing system according to a second embodiment of the present invention.
Figure 32:
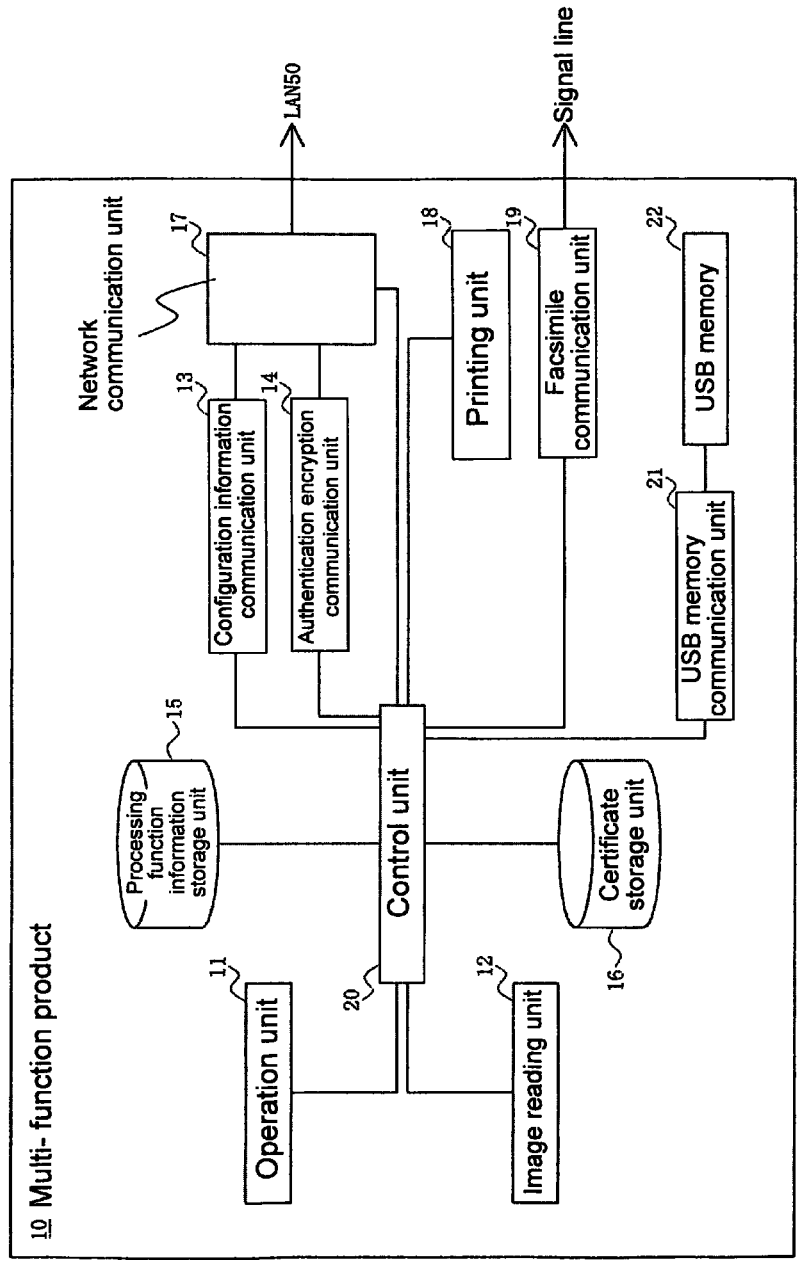
FIG. 32 is a schematic view showing a configuration of a multi-function product according to the second embodiment of the present invention.
Figure 33:
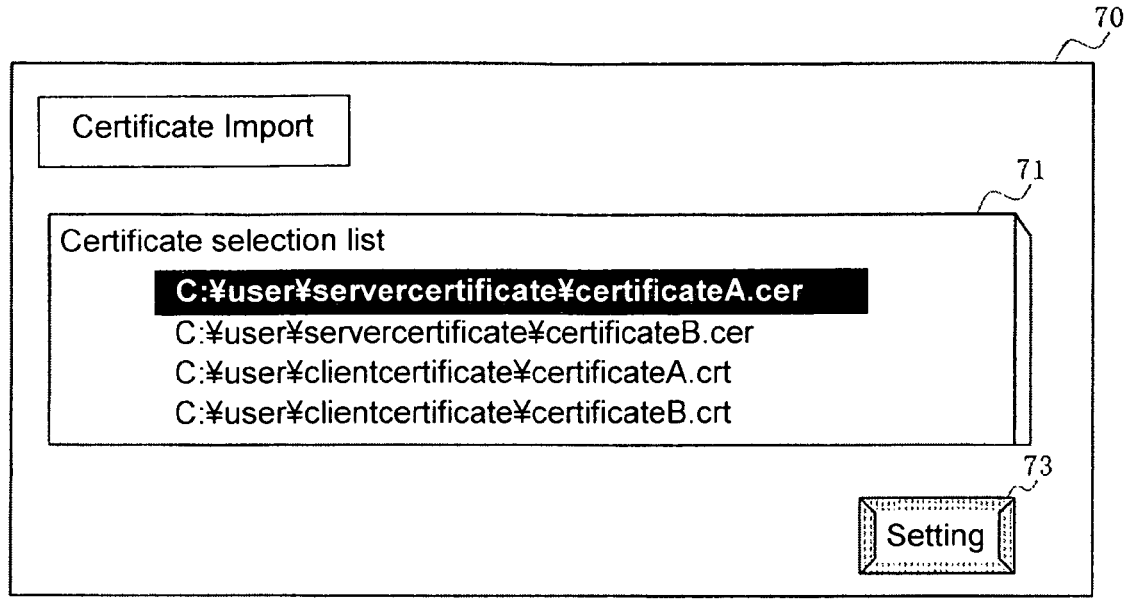
FIG. 33 is a schematic view showing an example of a certificate import screen according to the second embodiment of the present invention.
Figure 34:
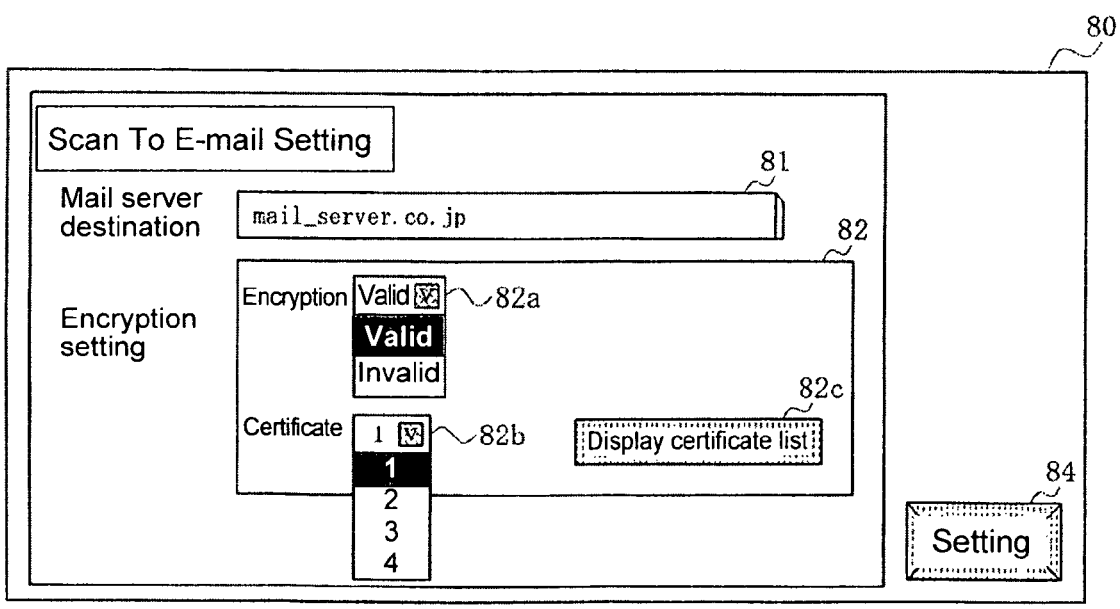
FIG. 34 is a schematic view showing an example of a processing function setting screen according to the second embodiment of the present invention.

FIG. 31 is a schematic view showing a configuration of an image processing system according to the second embodiment of the present invention. FIG. 32 is a schematic view showing a configuration of the multi-function product 10 according to the second embodiment of the present invention. FIG. 33 is a schematic view showing an example of the certificate import screen 70 according to the second embodiment of the present invention. FIG. 34 is a schematic view showing an example of the processing function setting screen 80 according to the second embodiment of the present invention.

As shown in FIG. 31, the multi-function product 10 is connected to the mail server 40 through the LAN 50. Note that the multi-function product 10 and the mail server 40 are adopted to be capable of communication with TCP/IP, and the PC 30 is omitted.

As shown in FIG. 32, the multi-function product 10 includes the operation unit 11; the image reading unit 12; the configuration information communication unit 13; the authentication encryption communication unit 14; the processing function information storage unit 15; the certificate storage unit 16; the network communication unit 17; the printing unit 18; the facsimile communication unit 19; and the control unit 20. Further, the multi-function product 10 includes a USB (Universal Serial Bus) memory communication unit 21 as a communication unit for communicating with a USB memory 22 attached to the multi-function product 10; and the USB memory 22 to be attached to the multi-function product 10 for storing the certificate when the certificate is imported to the multi-function product 10.

In the embodiment, the operation unit 11; the image reading unit 12; the configuration information communication unit 13; the authentication encryption communication unit 14; the processing function information storage unit 15; the certificate storage unit 16; the network communication unit 17; the printing unit 18; the facsimile communication unit 19; the USB memory communication unit 21; and the USB memory 22 are connected to the control unit 20 through a signal line, so that the control unit 20 controls an entire operation of the multi-function product 10.

As shown in FIG. 4, the operation unit 11 of the multi-function product 10 includes the operation panel 60 as a display unit. The operation panel 60 is a touch panel having a display function and an input function. More specifically, the operation panel 60 includes a display device such as an LCD (Liquid Crystal Display) panel and an LED (Liquid Emitting Diode) panel, and an input device such as a touch sensor. Further, the operation panel 60 includes the destination setting section 61 for setting a destination of an image set in the image reading unit 12, the transmission button 62 for transmitting the image, and the likes. An operator operates the operation panel 60 to set image transmission and transmission direction.

In the embodiment, the operation panel 60 displays the certificate import page 70 shown in FIG. 33. The certificate import page 70 includes the certificate selection list 71 and a setting request button 73. The selection list 71 displays a list of the certificates stored in the USB memory 22, so that the operator selects the certificate to be imported. When the setting request button 73 is clicked, the importation of the certificate starts.

As the processing function in the second embodiment, similar to the description of the first embodiment, the "Scan To E-mail" function will be explained next as an example.

As shown in FIG. 34, the processing function setting page 80 is displayed on the operation panel 60. The processing function setting page 80 includes the mail server destination form column 81 and the encryption setting column 82. A destination of the mail server 40 is input in the mail server destination form column 81 for relaying when the "Scan To E-mail" function is used in the multi-function product 10.

In the embodiment, the encryption setting column 82 includes the encryption setting pull down menu 82*a*; the certificate selection pull down menu 82*b*; and the certificate list display request button 82*c*. With the certificate selection pull down menu 82*b*, the encryption setting is switched between valid and invalid. When the encryption setting is switched to valid, the encryption using the certificate is applied to the "Scan To E-mail" function. With the certificate selection pull down menu 82*b*, the certificate is selected from the certificates stored in the certificate storage unit 16 of the multi-function product 10 for using the encryption communication of the "Scan To E-mail" function.

In the embodiment, the numbers of the certificates currently stored are displayed in the pull down list of the certificate selection pull down menu 82*b*. The number of the certificate is selected in the certificate selection pull down menu 82*b*, and the number corresponds to the number of the certificate number 65*a*. When the certificate stored in the multi-function product 10 is confirmed, the certificate list display request button 82*c* is clicked to request the certificate list 65.

In the second embodiment, other configurations are similar to those in the first embodiment, and explanations thereof are omitted.

Figure 35:
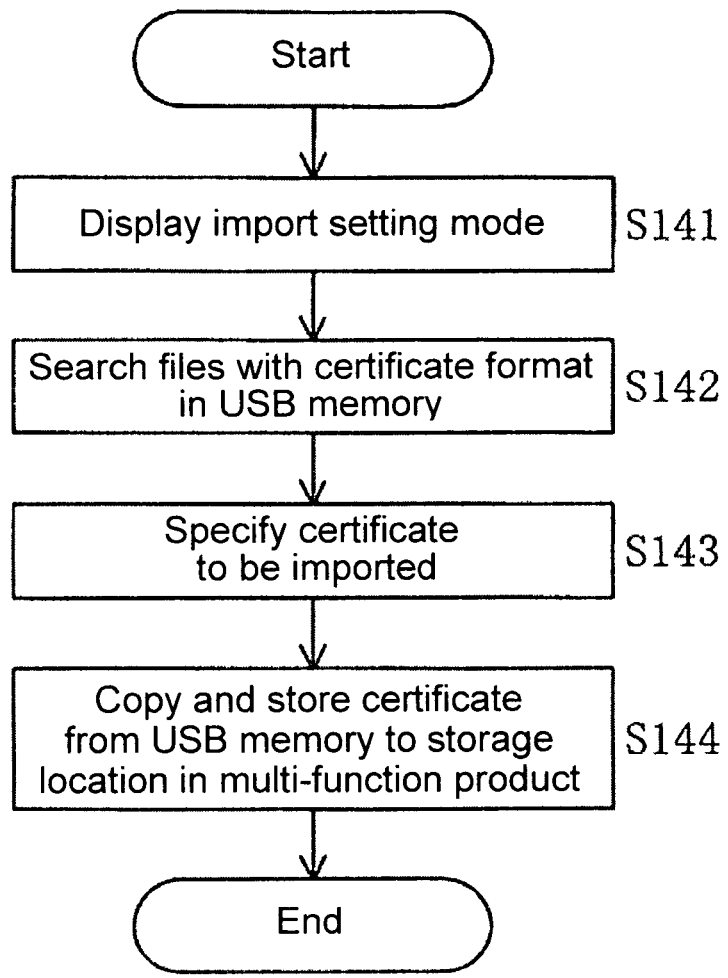
FIG. 35 is a flow chart showing an operation of the multi-function product for importing a certificate according to the second embodiment of the present invention.

An operation of the image processing system will be explained. First, an operation of import setting of the certificate through the operation panel 60 of the multi-function product 10 will be explained. FIG. 35 is a flow chart showing the operation of the multi-function product 10 for importing the certificate according to the second embodiment of the present invention.

First, when the operator requests the import setting mode, the multi-function product 10 displays the certificate import page 70 on the operation panel 60. Then, the multi-function product 10 searches for the files with the certificate format in the USB memory 22, and displays the files on the operation panel 60. The operator selects the certificate to be imported from the certificates displayed on the operation panel 60, thereby specifying the certificate to be imported. When the setting request button 73 is pushed, the certificate thus specified is copied and stored from the USB memory 22 to a storage location in the multi-function product 10.

The flow chart shown in FIG. 35 will be explained next. In step S141, the import setting mode is displayed. In step S142, the files with the certificate format in the USB memory 22 are searched. In step S143, the certificate to be imported is specified. In step S144, the certificate is copied and stored from the USB memory 22 to the storage location in the multi-function product 10.

Figure 36:
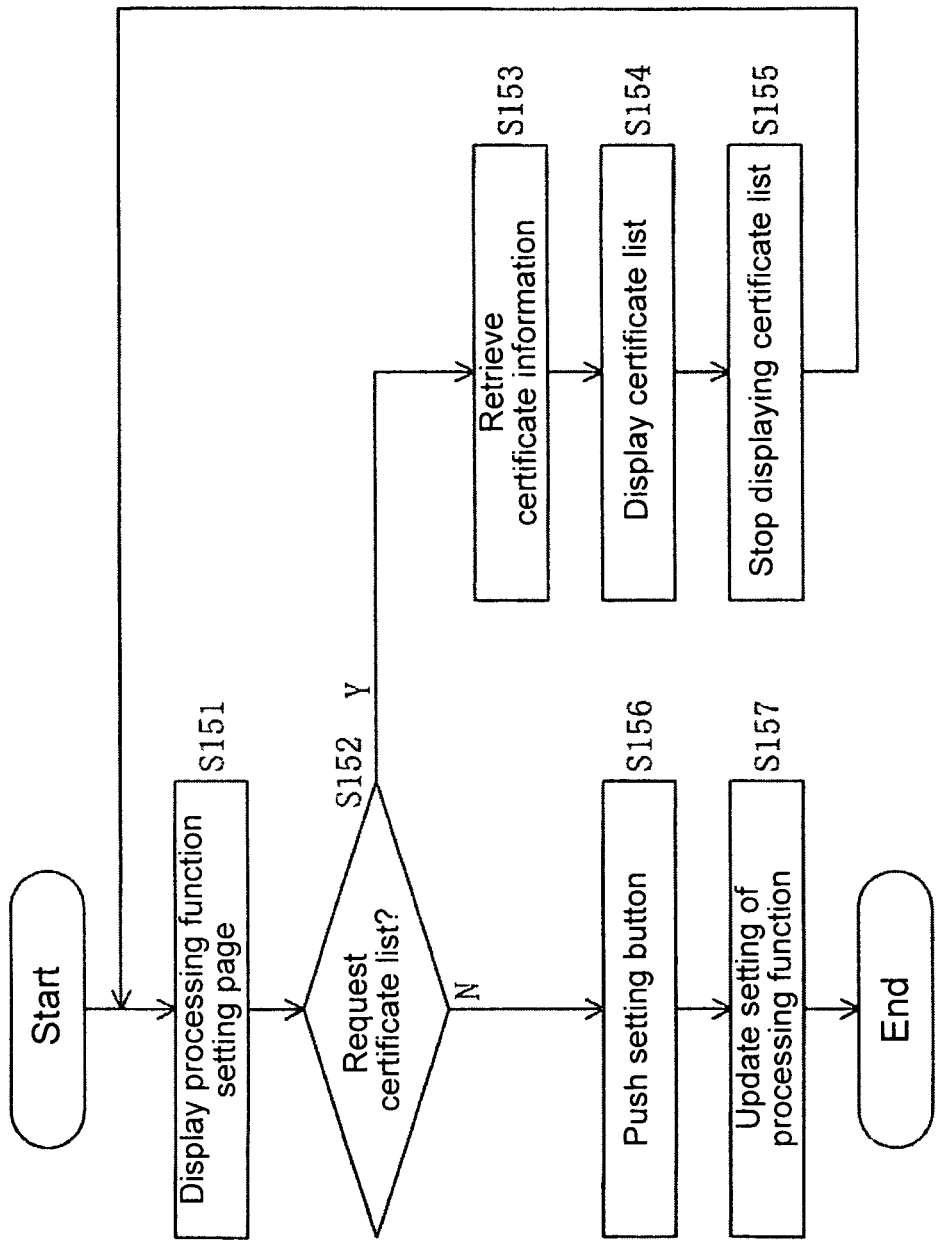
FIG. 36 is a flow chart showing an operation of the multi-function product for setting the certificate according to the second embodiment of the present invention.

An operation of setting the certificate corresponding to the processing function through the operation panel 60 of the multi-function product 10 will be explained next. FIG. 36 is a flow chart showing the operation of the multi-function product 10 for setting the certificate according to the second embodiment of the present invention.

First, when the operator operates the operation panel 60 to specify the processing function setting mode, the multi-function product 10 displays the processing function setting page 80 on the operation panel 60. Then, the multi-function product 10 determines whether the operator requests the certificate list. When the operator requests the certificate list, that is, the operator clicks the certificate list display request button 82c, the multi-function product 10 retrieves the certificate information for creating the certificate list 65. Then, the multi-function product 10 displays the certificate list 65 thus created according to the certificate information thus retrieved. The page thus displayed has the format shown in FIG. 5. After the operator confirms the certificate list 65, when the operator operates to stop displaying the certificate list 65, the processing function setting page 80 is displayed again.

When the operator does not request the certificate list, the setting of the "Scan To E-mail" function is completed. When the operator pushes a setting button 84 to update the setting of the processing function, the multi-function product 10 updates the setting of the processing function.

The flow chart shown in FIG. 36 will be explained next. In step S151, the processing function setting page 80 is displayed on the operation panel 60. In step S152, it is determined whether the operator requests the certificate list. When the operator requests the certificate list, the process proceeds to step S153. When the operator does not request the certificate list, the process proceeds to step S156.

In step S153, the certificate information is retrieved for creating the certificate list 65. In step S154, the certificate list 65 created according to the certificate information is displayed. In step S155, the certificate list 65 stops being displayed. In step S156, the operator pushes the setting button 84. In step S157, the setting of the processing function is updated.

In the second embodiment, the method of using the certificate correlated to the processing function is similar to that in the first embodiment, and an explanation thereof is omitted.

As described above, in the second embodiment, as the function of collectively administrating the certificates stored in the multi-function product 10, the correlation between the processing function and the certificate is output, thereby making it easy for the operator to confirm the correlation.

Further, as compared with the first embodiment, it is possible to import the certificate, and to set and confirm the correlation between the certificate and the processing function through the operation panel 60 of the multi-function product 10, not through the PC 30, i.e., the separate terminal connected to the network.

In the embodiments described above, the multi-function product 10 is explained as the image processing apparatus, and the present invention is applicable to an apparatus capable of processing an image such as a printer, a facsimile, a multi-function product, and the likes.

The disclosure of Japanese Patent Application No. 2008-045682, filed on Feb. 27, 2008, is incorporated in the application by the reference.

While the invention has been explained with reference to the specific embodiments of the invention, the explanation is illustrative and the invention is limited only by the appended claims.

What is claimed is:

1. An image processing apparatus having a Scan To E-mail function and a Scan To FTP (File Transfer Protocol) function, comprising:
   a certificate data storage unit for storing first certificate data for the Scan To E-mail function and second certificate data for the Scan To FTP function;
   a control unit for performing the Scan To E-mail function according to the first certificate data and the Scan To FTP function according to the second certificate data; and
   a corresponding status output unit for outputting a certificate list including a first record and a second record,
   wherein said first record represents a correlation between the first certificate data and the Scan To E-mail function, and
   said second record represents a correlation between the second certificate data and the Scan To FTP function.

2. The image processing apparatus according to claim 1, further comprising an updating unit for updating the certificate list.

3. The image processing apparatus according to claim 1, wherein said corresponding status output unit includes a display unit for displaying the certificate list.

4. The image processing apparatus according to claim 1, wherein said control unit is configured to perform the Scan To E-mail function according to the first certificate data including at least one of a certificate number, a subject, an issuer, and a valid period, and perform the second image processing function according to the second certificate data including at least one of a certificate number, a subject, an issuer, and a valid period.

5. The image processing apparatus according to claim 1, further comprising a communication unit for communicating with an external device so that the control unit is able to perform the Scan To E-mail function and the Scan To FTP function.

6. The image processing apparatus according to claim 1, wherein said certificate data storage unit is configured to store the first certificate, data and the second certificate data so that the first certificate data and the second certificate data are respectively correlated to user information.

7. The image processing apparatus according to claim 1, further comprising an operation unit for inputting user information so that the control unit controls the corresponding status output unit to display a list of the Scan To E-mail function and the Scan To FTP function performed according to the first certificate data and the second certificate data correlated to the user information.

8. An image processing system comprising:
- an image processing apparatus having a Scan To E-mail function and Scan To FTP (File Transfer Protocol) function different; and
- an information processing apparatus connected to the image processing apparatus to be able to communicate therewith,
- wherein said image processing apparatus includes,
- a certificate data storage unit for storing first certificate data for the Scan To E-mail function and the second certificate data for the Scan To FTP function;
- a control unit for performing the Scan To E-mail function according to the first certificate data and the Scan To FTP function according to the second certificate data;
- a corresponding status output unit for outputting a certificate list including a first record and a second record,
- wherein said first record represents a correlation between the first certificate data and the Scan To E-mail function, and
- said second record represents a correlation between the second certificate data and the Scan To FTP function, and
- said information processing apparatus includes,
- a correlation receiving unit for receiving a certificate list from the corresponding status output unit; and
- a display unit for displaying the certificate list.

9. The image processing system according to claim 8, wherein said image processing apparatus further includes an updating unit for updating the certificate list, and
- said information processing apparatus further includes an update directing unit for directing the updating unit to update the certificate list.

* * * * *